United States Patent
Maleki et al.

(10) Patent No.: US 12,022,396 B2
(45) Date of Patent: Jun. 25, 2024

(54) DISCOVERY OF AND RECOVERY FROM MISSED WAKE-UP SIGNAL (WUS) RECEPTION

(71) Applicant: Telefonaktiebolaget LM Ericsson (publ), Stockholm (SE)

(72) Inventors: Sina Maleki, Malmö (SE); Andres Reial, Lomma (SE); Niklas Andgart, Södra Sandby (SE); Ali Nader, Malmö (SE); Ilmiawan Shubhi, Malmö (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 119 days.

(21) Appl. No.: 17/605,702

(22) PCT Filed: Apr. 28, 2020

(86) PCT No.: PCT/EP2020/061773
§ 371 (c)(1),
(2) Date: Oct. 22, 2021

(87) PCT Pub. No.: WO2020/225031
PCT Pub. Date: Nov. 12, 2020

(65) Prior Publication Data
US 2022/0182943 A1  Jun. 9, 2022

Related U.S. Application Data

(60) Provisional application No. 62/843,102, filed on May 3, 2019.

(51) Int. Cl.
*H04W 52/02* (2009.01)
(52) U.S. Cl.
CPC ... *H04W 52/0241* (2013.01); *H04W 52/0229* (2013.01)

(58) Field of Classification Search
CPC ......... H04W 52/0241; H04W 52/0229; H04W 52/028; H04W 68/025; H04W 52/0245;
(Continued)

(56) References Cited

U.S. PATENT DOCUMENTS

| 11,564,170 B2* | 1/2023 | Zhang ............... H04W 72/23 |
| 2019/0053321 A1 | 2/2019 | Islam et al. |
| 2020/0337110 A1* | 10/2020 | Kim ................. H04W 76/28 |

FOREIGN PATENT DOCUMENTS

| WO | 2018204799 A1 | 11/2018 |
| WO | 2020145869 A1 | 7/2020 |

OTHER PUBLICATIONS

"3GPP TS 23.501 V16.0.0", 3rd Generation Partnership Project; Technical Specification Group Services and System Aspects; System Architecture for the 5G System; Stage 2 (Release 16), Mar. 2019, pp. 1-318.
(Continued)

*Primary Examiner* — Marcos L Torres
(74) *Attorney, Agent, or Firm* — Murphy, Bilak & Homiller, PLLC

(57) ABSTRACT

Embodiments include methods for selective transmission of wake-up signals (WUS) to a user equipment (UE) by a network node in a RAN. Such methods include transmitting a WUS to the UE during a first occasion and, during one or more second occasions, monitoring for WUS feedback from the UE in response to the WUS. Such methods include, based on the results of the monitoring, selectively transmitting one or more further WUS to the UE during respective one or more third occasions. The WUS feedback can be received in various ways in different embodiments. In some embodiments, such methods include other operations after a predetermined number of repetitions of detecting no WUS feedback from the UE during second occasions and transmitting further WUS to the UE during third occasions. Other
(Continued)

embodiments include complementary methods for a UE, as well as network nodes and UEs configured to perform such methods.

10 Claims, 11 Drawing Sheets

(58) Field of Classification Search
CPC . H04W 76/27; H04W 76/28; H04W 52/0216; Y02D 30/70
See application file for complete search history.

(56) References Cited

OTHER PUBLICATIONS

"3GPP TS 33.401 V15.7.0", 3rd Generation Partnership Project; Technical Specification Group Services and System Aspects; 3GPP System Architecture Evolution (SAE); Security architecture (Release 15), Mar. 2019, pp. 1-163.
"3GPP Ts 38.211 V16.1.0", 3rd Generation Partnership Project; Technical Specification Group Radio Access Network; NR; Physical channels and modulation (Release 16), Mar. 2020, pp. 1-130.
"3GPP TS 38.214 V15.0.0", 3rd Generation Partnership Project; Technical Specification Group Radio Access Network; NR; Physical layer procedures for data (Release 15), Dec. 2017, pp. 1-71.
"3GPP TS 38.401 V15.5.0", 3rd Generation Partnership Project; Technical Specification Group Radio Access Network; NG-RAN; Architecture description (Release 15), Mar. 2019, pp. 1-39.
"3GPP TS 38.213 V15.4.0", 3rd Generation Partnership Project; Technical Specification Group Radio Access Network; NR; Physical layer procedures for control (Release 15), Dec. 2018, pp. 1-104.
"3GPP TR 38.801 V2.0.0", 3rd Generation Partnership Project; Technical Specification Group Radio Access Network; Study on New Radio Access Technology; Radio Access Architecture and Interfaces (Release 14), Mar. 2017, pp. 1-90.

* cited by examiner

DISCOVERY OF AND RECOVERY FROM MISSED WAKE-UP SIGNAL (WUS) RECEPTION

TECHNICAL FIELD

The present invention generally relates to wireless communication networks, and particularly relates to improvements to in wireless device energy consumption by use of wake-up signals (WUS).

BACKGROUND INFORMATION

Currently the fifth generation ("5G") of cellular systems, also referred to as New Radio (NR), is being standardized within the Third-Generation Partnership Project (3GPP). NR is developed for maximum flexibility to support multiple and substantially different use cases. These include enhanced mobile broadband (eMBB), machine type communications (MTC), ultra-reliable low latency communications (URLLC), side-link device-to-device (D2D), and several other use cases. The present disclosure relates generally to NR, but the following description of Long-Term Evolution (LTE) technology is provided for context since it shares many features with NR.

LTE is an umbrella term for so-called fourth-generation (4G) radio access technologies developed within the Third-Generation Partnership Project (3GPP) and initially standardized in Release 8 (Rel-8) and Release 9 (Rel-9), also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases.

3GPP LTE Rel-10 supports bandwidths larger than 20 MHz. One important requirement on Rel-10 is to assure backward compatibility with LTE Rel-8. This should also include spectrum compatibility. As such, a wideband LTE Rel-10 carrier (e.g., wider than 20 MHz) should appear as a number of carriers to an LTE Rel-8 ("legacy") terminal. Each such carrier can be referred to as a Component Carrier (CC). For an efficient use of a wide carrier also for legacy terminals, legacy terminals can be scheduled in all parts of the wideband LTE Rel-10 carrier. One exemplary way to achieve this is by means of Carrier Aggregation (CA), whereby a Rel-10 terminal can receive multiple CCs, each preferably having the same structure as a Rel-8 carrier. Similarly, one of the enhancements in LTE Rel-11 is an enhanced Physical Downlink Control Channel (ePDCCH), which has the goals of increasing capacity and improving spatial reuse of control channel resources, improving inter-cell interference coordination (ICIC), and supporting antenna beamforming and/or transmit diversity for control channel. Furthermore, LTE Rel-12 introduced dual connectivity (DC) whereby a UE can be connected to two network nodes simultaneously, thereby improving connection robustness and/or capacity.

An overall exemplary architecture of a network comprising LTE and SAE is shown in FIG. 1. E-UTRAN 100 includes one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third-generation ("3G") and second-generation ("2G") 3GPP RANs are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. Each of the eNBs can serve a geographic coverage area including one more cells, including cells 106, 111, and 116 served by eNBs 105, 110, and 115, respectively. UE 120 can connect to one or more of eNBs 105, 110, 115 via respective cells 106, 111, 116.

The eNBs in the E-UTRAN communicate with each other via the X1 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. Generally speaking, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Protocol (IP) data packets (e.g., data or user plane) between the UE and the EPC and serves as the local mobility anchor for the data bearers when the UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations.

In some embodiments, HSS 131 can communicate with a user data repository (UDR)-labelled EPC-UDR 135 in FIG. 1—via a Ud interface. EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

FIG. 2A shows a high-level block diagram of an exemplary LTE architecture in terms of its constituent entities—UE, E-UTRAN, and EPC—and high-level functional division into the Access Stratum (AS) and the Non-Access Stratum (NAS). FIG. 2A also illustrates two particular interface points, namely Uu (UE/E-UTRAN Radio Interface) and S1 (E-UTRAN/EPC interface), each using a specific set of protocols, i.e., Radio Protocols and S1 Protocols.

FIG. 2B illustrates a block diagram of an exemplary Control (C)-plane protocol stack between a UE, an eNB, and an MME. The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PDCP layer provides ciphering/deciphering and integrity protection for both U-plane and C-plane, as well as other functions for the U-plane such as header compression. The exemplary protocol stack also includes non-access stratum (NAS) signaling between the UE and the MME.

The RRC layer controls communications between a UE and an eNB at the radio interface, as well as the mobility of a UE between cells in the E-UTRAN. After a UE is powered ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE's radio is active on a discontinuous reception (DRX) schedule configured by upper layers. During DRX active periods (also referred to as "DRX On durations"), an RRC_IDLE IE receives system information (SI) broadcast by a serving cell, performs measurements of neighbor cells to support cell reselection, and monitors a paging channel on PDCCH for pages from the EPC via eNB. A UE in RRC_IDLE state is known in the EPC and has an assigned IP address, but is not known to the serving eNB (e.g., there is no stored context).

Logical channel communications between a UE and an eNB are via radio bearers. Since LTE Rel-8, signaling radio bearers (SRBs) SRB0, SRB1, and SRB2 have been available for the transport of RRC and NAS messages. SRB0 is used for RRC connection setup, RRC connection resume, and RRC connection re-establishment. Once any of these operations has succeeded, SRB1 is used for handling RRC messages (which may include a piggybacked NAS message) and for NAS messages prior to establishment of SRB2. SRB2 is used for NAS messages and lower-priority RRC messages (e.g., logged measurement information). SRB0 and SRB1 are also used for establishment and modification of data radio bearers (DRBs) for carrying user data between the UE and eNB.

The multiple access scheme for the LTE PHY is based on Orthogonal Frequency Division Multiplexing (OFDM) with a cyclic prefix (CP) in the downlink, and on Single-Carrier Frequency Division Multiple Access (SC-FDMA) with a cyclic prefix in the uplink. To support transmission in paired and unpaired spectrum, the LTE PHY supports both Frequency Division Duplexing (FDD) (including both full- and half-duplex operation) and Time Division Duplexing (TDD). The LTE FDD downlink (DL) radio frame has a fixed duration of 10 ms and consists of 20 slots, labelled 0 through 19, each with a fixed duration of 0.5 ms. A 1-ms subframe comprises two consecutive slots where subframe i consists of slots 2i and 2i+1. Each exemplary DL slot consists of $N^{DL}_{symb}$ OFDM symbols, each of which is comprised of $N_{sc}$ OFDM subcarriers. Exemplary values of $N^{DL}_{symb}$ can be 7 (with a normal CP) or 6 (with an extended-length CP) for subcarrier spacing (SCS) of 15 kHz. The value of $N_{sc}$ is configurable based upon the available channel bandwidth. Since persons of ordinary skill in the art are familiar with the principles of OFDM, further details are omitted in this description. An exemplary uplink slot can be configured in similar manner as discussed above, but comprising $N^{UL}_{symb}$ OFDM symbols, each of which includes $N_{sc}$ subcarriers.

A combination of a particular subcarrier in a particular symbol is known as a resource element (RE). Each RE is used to transmit a particular number of bits, depending on the type of modulation and/or bit-mapping constellation used for that RE. For example, some REs may carry two bits using QPSK modulation, while other REs may carry four or six bits using 16- or 64-QAM, respectively. The radio resources of the LTE PHY are also defined in terms of physical resource blocks (PRBs). A PRB spans $N^{RB}_{sc}$ subcarriers over the duration of a slot (i.e., $N^{DL}_{symb}$ symbols), where $N^{RB}_{sc}$ is typically either 12 (with a 15-kHz SCS) or 24 (7.5-kHz SCS). The configuration of 15-kHz SCS and "normal" CP is often referred to as the numerology, p.

In general, an LTE physical channel corresponds to a set of REs carrying information that originates from higher layers. Downlink (i.e., eNB to UE) physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH). In addition, the LTE PHY downlink includes various reference signals (e.g., channel state information reference signals, CSI-RS), synchronization signals, and discovery signals.

PDSCH is the main physical channel used for unicast downlink data transmission, but also for transmission of RAR (random access response), certain system information blocks, and paging information. PBCH carries the basic system information, required by the UE to access the network. PDCCH is used for transmitting downlink control information (DCI) including scheduling information for DL messages on PDSCH, grants for UL transmission on PUSCH, and channel quality feedback (e.g., CSI) for the UL channel. PHICH carries HARQ feedback (e.g., ACK/NAK) for UL transmissions by the UEs.

Uplink (i.e., UE to eNB) physical channels provided by the LTE PHY include Physical Uplink Shared Channel (PUSCH), Physical Uplink Control Channel (PUCCH), and Physical Random-Access Channel (PRACH). In addition, the LTE PHY uplink includes various reference signals including demodulation reference signals (DM-RS), which are transmitted to aid the eNB in the reception of an associated PUCCH or PUSCH; and sounding reference signals (SRS), which are not associated with any uplink channel.

PUSCH is the uplink counterpart to the PDSCH. PUCCH is used by UEs to transmit uplink control information (UCI) including HARQ feedback for eNB DL transmissions, channel quality feedback (e.g., CSI) for the DL channel, scheduling requests (SRs), etc. PRACH is used for random access preamble transmission.

Within the LTE DL, certain REs within each LTE subframe are reserved for the transmission of reference signals, such as DM-RS mentioned above. Other DL reference signals include cell-specific reference signals (CRS), positioning reference signals (PRS), and CSI reference signals (CSI-RS). UL reference signals include DM-RS and SRS mentioned above. Other RS-like DL signals include Primary Synchronization Sequence (PSS) and Secondary Synchronization Sequence (SSS), which facilitate the UEs time and frequency synchronization and acquisition of system parameters (e.g., via PBCH).

In LTE, UL and DL data transmissions (e.g., on PUSCH and PDSCH, respectively) can take place with or without an explicit grant or assignment of resources by the network (e.g., eNB). In general, UL transmissions are usually referred to as being "granted" by the network (i.e., "UL grant"), while DL transmissions are usually referred to as taking place on resources that are "assigned" by the network (i.e., "DL assignment").

In case of a transmission based on an explicit grant/assignment, DCI is sent to the UE informing it of specific radio resources to be used for the transmission. In contrast, a transmission without an explicit grant/assignment is typically configured to occur with a defined periodicity. Given a periodic and/or recurring UL grant and/or DL assignment, the UE can then initiate a data transmission and/or receive data according to a predefined configuration. Such transmissions can be referred to as semi-persistent scheduling (SPS), configured grant (CG), or grant-free transmissions.

The fifth generation (5G) NR technology shares many similarities with fourth-generation LTE. For example, NR uses CP-OFDM (Cyclic Prefix Orthogonal Frequency Division Multiplexing) in the DL and both CP-OFDM and DFT-spread OFDM (DFT-S-OFDM) in the UL. As another example, in the time domain, NR DL and UL physical resources are organized into equal-sized 1-ms subframes. A subframe is further divided into multiple slots of equal duration, with each slot including multiple OFDM-based symbols. As another example, NR RRC layer includes RRC_IDLE and RRC_CONNECTED states, but adds an additional state known as RRC_INACTIVE, which has some properties similar to a "suspended" condition used in LTE.

In addition to providing coverage via "cells," as in LTE, NR networks also provide coverage via "beams." In general, a DL "beam" is a coverage area of a network-transmitted RS that may be measured or monitored by a UE. In NR, for example, such RS can include any of the following, alone or in combination: SS/PBCH block (SSB), CSI-RS, tertiary reference signals (or any other sync signal), positioning RS (PRS), DMRS, phase-tracking reference signals (PTRS), etc. In general, SSB is available to all UEs regardless of RRC state, while other RS (e.g., CSI-RS, DM-RS, PTRS) are associated with specific UEs that have a network connection, i.e., in RRC_CONNECTED state. Furthermore, time-frequency resources can be configured much more flexibly for an NR cell than for an LTE cell. For example, rather than a fixed 15-kHz SCS as in LTE, NR SCS can range from 15 to 240 kHz.

In both LTE and NR, a UE in RRC_CONNECTED state monitors PDCCH for DL scheduling assignments (e.g., for PDSCH), UL resource grants (e.g., for PUSCH), and for other purposes. Depending on DRX configuration, in both LTE and NR, a UE may spend a substantial part of its energy on decoding PDCCH without detecting a DL scheduling assignment or UL resource grant directed to it. Techniques to reduce unnecessary PDCCH monitoring, allow a UE to go to sleep more often and/or for longer periods, or allow a UE to wake up less frequently and/or for shorter periods can be beneficial.

One such technique is sending a Wake-up Signal (WUS) that can be detected by the UE using much less energy relative to PDCCH detection. When a UE detects a WUS intended for it, the UE will wake up and activate a conventional PDCCH decoder. One disadvantage of WUS is relatively low robustness and/or reliability for detection by the UE. This can lead to various conditions in which the UE fails to detect a WUS intended for it, or falsely detects a WUS when none was intended for it. These conditions can cause the UE and/or the network to perform various actions that can increase UE energy consumption, drop UE connections with the network, and waste network resources.

SUMMARY

Embodiments of the present disclosure provide specific improvements to communication between user equipment (UE) and network nodes in a wireless communication network, such as by facilitating solutions to overcome the exemplary problems summarized above and described in more detail below.

Some exemplary embodiments include methods (e.g., procedures) for selective transmission of a wake-up signal (WUS) to a user equipment (UE). The exemplary method can be performed by a network node (e.g., base station, eNB, gNB, etc., or component thereof) of a radio access network (RAN, e.g., E-UTRAN, NG-RAN), in communication with the UE (e.g., wireless device, IoT device, MTC device, etc. or component thereof).

These exemplary methods can include transmitting a WUS to the UE during a first occasion. In some embodiments, the WUS can be transmitted as downlink control information (DCI) on a physical downlink control channel (PDCCH), and can indicate that the UE should monitor for a scheduling message on the PDCCH during a subsequent discontinuous reception (DRX) On duration for the UE. These exemplary methods can also include, during one or more second occasions, monitoring for WUS feedback from the UE in response to the WUS. These exemplary methods can also include, based on the results of the monitoring, selectively transmitting one or more further WUS to the UE during respective one or more third occasions.

In some embodiments, the WUS transmitted to the UE also includes a bitfield of a plurality of bits, with each bit in the bitfield indicating whether the WUS is intended for a corresponding member of a group of UEs. In some embodiments, the WUS transmitted to the UE can also include a repetition indicator, e.g., having a value indicating a number of transmission repetitions of the WUS by the network node. In such embodiments, the selective transmission operations can include incrementing the repetition indicator included in each further WUS that is transmitted.

In some embodiments, the WUS can differ from the one or more further WUS in one or more of the following transmission characteristics: aggregation level, modulation and coding scheme, power level, interference from other signals transmitted concurrently, positions within respective timeslots, and frequency resources.

In some embodiments, these exemplary methods can also include transmitting, to the UE, information identifying one or more monitoring occasions, including the first occasion, for WUS transmissions by the network node. For example, at least a portion of the identified WUS monitoring occasions are not associated with subsequent physical downlink control channel (PDCCH) transmissions by the network node.

In some embodiments, the selective transmission operations can include, based on detecting no WUS feedback from the UE during one of the second occasions, transmitting a further WUS to the UE during a corresponding third occasion. In some embodiments, these exemplary methods can also include, after a predetermined number of repetitions of detecting no WUS feedback from the UE during second occasions and transmitting further WUS to the UE during corresponding third occasions, performing one of the following operations: declaring a radio link failure (RLF) of the UE, or configuring the UE to wake up for monitoring a physical downlink control channel (PDCCH) independent of the UE's reception of the WUS.

In some embodiments, these exemplary methods can also include transmitting, to a UE, a transmission configuration for periodic channel state information (CSI) reports during at least a first portion of the second occasion. In such embodiments, the transmission configuration can identify a parameter to be excluded from a periodic CSI report that is not responsive to UE detection of a WUS, and the monitoring operations can include monitoring for the periodic CSI reports during the second occasions. In addition, selectively transmitting the further WUS to the UE during each third occasion can be based on whether a periodic CSI report received during a corresponding second occasion includes the parameter.

In some embodiments, these exemplary methods can also include transmitting, to the UE, a physical downlink control channel (PDCCH) message with scheduling information for a subsequent physical downlink shared channel (PDSCH) transmission by the network node, and performing the PDSCH transmission according to the scheduling information. In such embodiments, the selective transmission can be based on detecting no WUS feedback during a second occasion in the same timeslot as the PDCCH message and during a second occasion after the PDSCH transmission.

In some embodiments, the monitoring operations can include monitoring for periodic CSI reports during a first portion of the second occasions, and monitoring for a response, by the UE, to the PDCCH message or the PDSCH transmission during a second portion of the second occasions. In such embodiments, the selective transmission can be based on detecting periodic CSI feedback from the UE during a corresponding occasion of the first portion and detecting no response by the UE during a corresponding occasion of the second portion.

In some embodiments, these exemplary methods can also include transmitting, to the UE, a transmission configuration for WUS feedback in response to detecting a WUS intended for the UE. In some of these embodiments, the transmission configuration for the WUS feedback includes a request for an aperiodic channel state information (CSI) report from the UE. In such embodiments, the monitoring operations can include monitoring a physical uplink channel for the aperiodic CSI report, e.g., which can be responsive to the UE detecting the WUS.

In other of these embodiments, the transmission configuration for the WUS feedback includes scheduling information (e.g., DCI) for a subsequent physical downlink shared channel (PDSCH) transmission by the network node. In such embodiments, the monitoring operations can include monitoring a physical uplink channel (e.g., PUCCH, PUSCH) for a hybrid ARQ response to the PDSCH transmission. For example, the hybrid ARQ response can indicate that the UE detected the WUS.

In other of these embodiments, the transmission configuration for the WUS feedback can include a configuration of resources for transmission of the WUS feedback, and a timing of the WUS feedback relative to the WUS transmission. In such embodiments, the configuration of resources and/or the relative timing can be included in the transmitted WUS.

Other exemplary embodiments include methods (e.g., procedures) for receiving wake-up signals (WUS) transmitted by a network node in a radio access network (RAN). These exemplary methods can be performed by a user equipment (UE, e.g., wireless device, IoT device, MTC device, etc. or components thereof) in communication with the network node (e.g., base stations, eNBs, gNBs, etc., or components thereof) in the RAN (e.g., E-UTRAN, NG-RAN).

These exemplary methods can include, during a first occasion, monitoring for a WUS that is intended for the UE. In some embodiments, the WUS can be received as downlink control information (DCI) on a physical downlink control channel (PDCCH), and can indicate that the UE should monitor for a scheduling message on the PDCCH during a subsequent discontinuous reception (DRX) On duration for the UE. These exemplary methods can also include selectively transmitting WUS feedback to the network node during one or more second occasions, and selectively monitoring for one or more further WUS, from the network node, during respective one or more third occasions. In some embodiments, the one or more second occasions correspond to the respective one or more third occasions.

In some embodiments, the WUS received by the UE can include a bitfield of a plurality of bits, with each bit in the bitfield indicating whether the WUS is intended for a corresponding member of a group of UEs. In such embodiments, selectively transmitting the WUS feedback can be based on a value of a particular one of the bits that is associated with the UE.

In some embodiments, the WUS received by the UE can also include a repetition indicator. In such embodiments, the selective monitoring can include determining whether a second value of the repetition indicator in a further WUS is greater than a first value of the repetition indicator in the WUS.

In some embodiments, the WUS can differ from the one or more further WUS in one or more of the following transmission characteristics: aggregation level, modulation and coding scheme, power level, interference from other signals transmitted concurrently, positions within respective timeslots, and frequency resources.

In some embodiments, these exemplary methods can also include receiving, from the network node, information identifying one or more monitoring occasions, including the first occasion, for monitoring for WUS transmissions directed the UE by the network node. In some embodiments, at least a portion of the monitoring occasions can be independent of occasions where the UE is configured to wake up for monitoring a physical downlink control channel (PDCCH). In some embodiments, the monitoring occasions can also include one or more further monitoring occasions, and these exemplary methods can also include refraining from monitoring for the WUS during the further monitoring occasions based on detecting the WUS during the first occasion.

In some embodiments, these exemplary methods can also include receiving, from the network node, a transmission configuration for periodic channel state information (CSI) reports during at least a first portion of the second occasions. In such embodiments, the transmission configuration can identify a parameter to be excluded from a periodic CSI report that is not responsive to UE detection of a WUS. In addition, the selective transmission operations can include transmitting the periodic CSI report during the second occasions, selectively including the parameter based on whether WUS was detected during the first occasion.

In some embodiments, these exemplary methods can also include, based on whether the WUS was detected during the first occasion, selectively monitoring for a physical downlink control channel (PDCCH) message with scheduling information for a subsequent physical downlink shared channel (PDSCH) transmission by the network node. In such embodiments, these exemplary methods can also include, based on whether the PDCCH message was successfully received, selectively monitoring for the PDSCH transmission according to the scheduling information. perform the PDSCH transmission according to the scheduling information.

In these embodiments, the selective transmission operation can include refraining from transmitting the WUS feedback based on not detecting the WUS, and optionally also the following operations: transmitting a negative acknowledgement (NACK) in the same timeslot as the PDCCH message based on unsuccessful reception of the PDCCH message; transmitting the NACK in an occasion after the PDSCH transmission based on successful reception of the PDCCH message and unsuccessful reception of the PDSCH transmission; transmitting a positive acknowledgement (ACK) in the occasion after the PDSCH transmission, based on successful reception of the PDCCH message and successful reception of the PDSCH transmission.

In some of these embodiments, the selective transmission operation can include transmitting the periodic CSI reports during the first portion of the second occasions and, during a second portion of the second occasions and based on detecting the WUS during the first occasion, transmitting a response indicating whether the PDCCH message and the PDSCH transmission were successfully received.

In some embodiments, the selective transmission operation can include transmitting a positive acknowledgement (ACK) based on detecting the WUS during the first occasion, and either transmitting a negative acknowledgement or refraining from transmitting WUS feedback based on the UE not detecting the WUS during the first occasion.

In some embodiments, these exemplary methods can also include receiving, from the network node, a transmission configuration for WUS feedback in response to detecting a WUS intended for the UE. In some of these embodiments, the transmission configuration for the WUS feedback includes a request for an aperiodic channel state information (CSI) report from the UE. In such embodiments, the selective transmission operation can include, based on detecting the WUS transmission during the first occasion, transmitting the aperiodic CSI report on a physical uplink channel (e.g., PUCCH, PUSCH). For example, the aperiodic CSI report can act as WUS feedback.

In other of these embodiments, the transmission configuration for the WUS feedback includes scheduling information (e.g., DCI) for a subsequent physical downlink shared channel (PDSCH) transmission by the network node. In such embodiments, the selective transmission operation can include, based on successfully receiving the PDSCH transmission, transmitting a hybrid ARQ response on a physical uplink channel. For example, the HARQ response can act as WUS feedback.

In other of these embodiments, the transmission configuration for the WUS feedback can include a configuration of resources for transmission of the WUS feedback, and a timing of the WUS feedback relative to the WUS transmission. In such embodiments, the configuration of resources and/or the relative timing can be included in the transmitted WUS.

Other exemplary embodiments include network nodes (e.g., radio base station(s), eNBs, gNBs, ng-eNBs, CUs/DUs, controllers, etc.) and user equipment (UEs, e.g., wireless devices, IoT devices, MTC devices, etc. or components thereof) configured to perform operations corresponding to any of the exemplary methods described herein. Other exemplary embodiments include non-transitory, computer-readable media storing program instructions that, when executed by processing circuitry of such network nodes or UEs, configure the same to perform operations corresponding to any of the exemplary methods described herein.

These and other objects, features, and advantages of the present disclosure will become apparent upon reading the following Detailed Description in view of the Drawings briefly described below.

BRIEF DESCRIPTION OF THE DRAWINGS

FIG. 13, which includes

DETAILED DESCRIPTION

Figure 1:
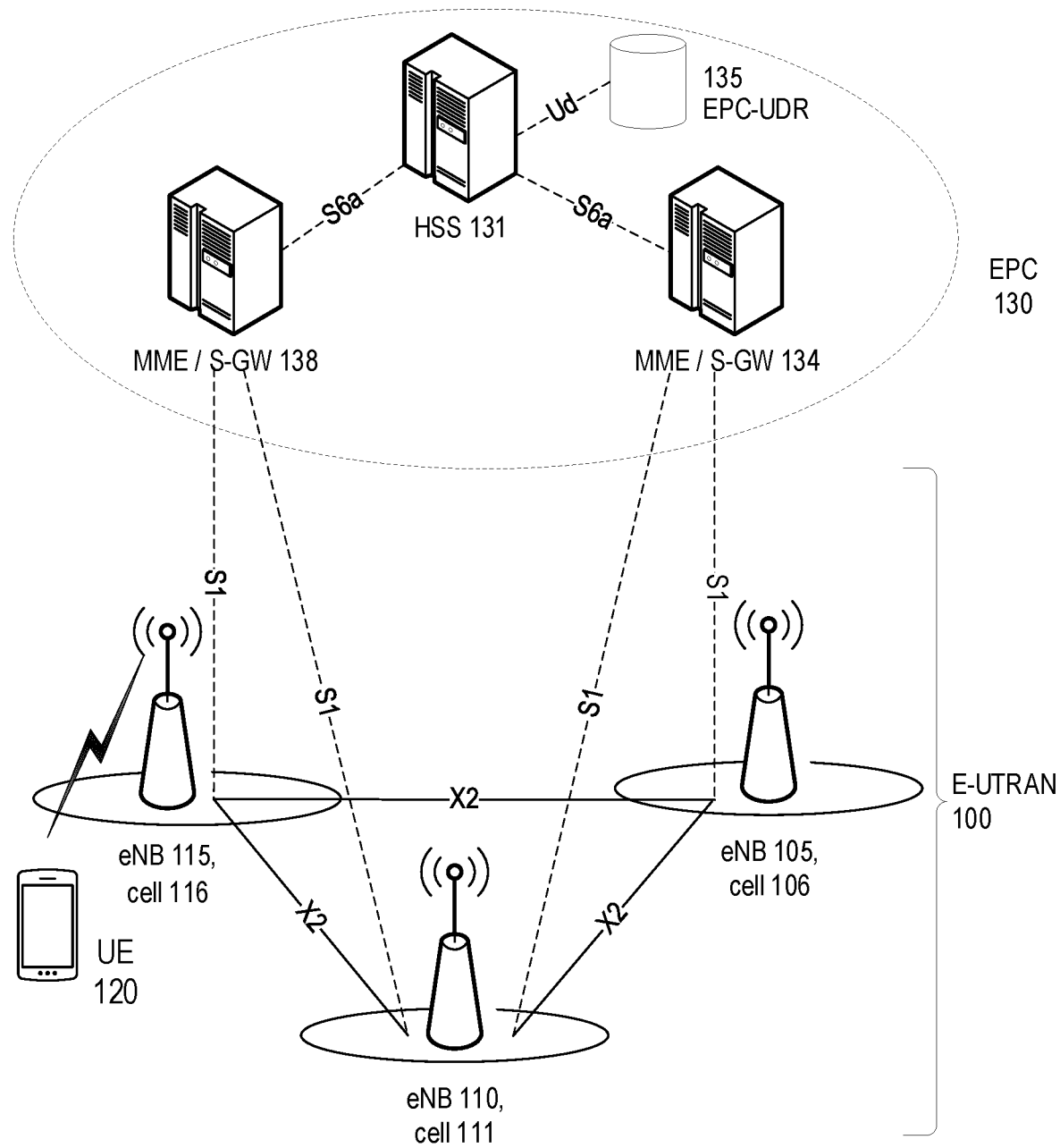
FIG. 1 is a high-level block diagram of an exemplary architecture of the Long-Term Evolution (LTE) Evolved UTRAN (E-UTRAN) and Evolved Packet Core (EPC) network.
Figure 2A:
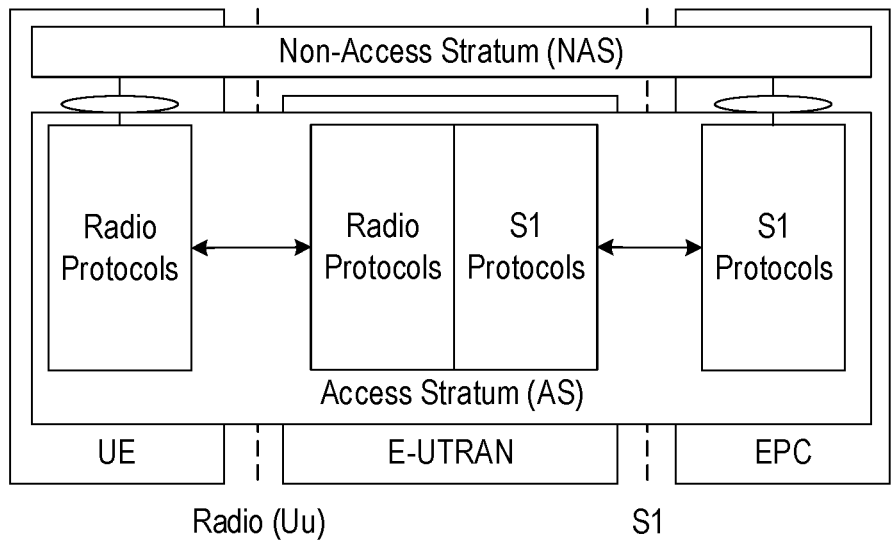
FIG. 2A is a high-level block diagram of an exemplary E-UTRAN architecture in terms of its constituent components, protocols, and interfaces.
Figure 2B:
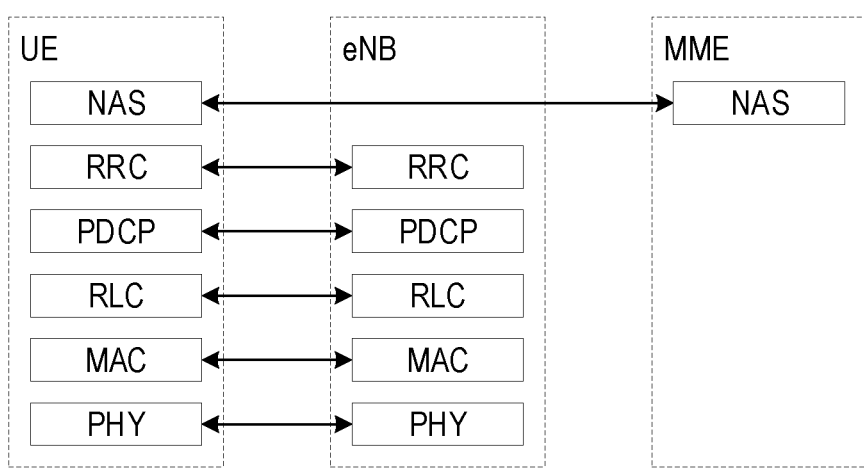
FIG. 2B is a block diagram of exemplary protocol layers of the control-plane portion of the radio (Uu) interface between a user equipment (UE) and the E-UTRAN.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are given by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. Any feature of any of the embodiments disclosed herein can be applied to any other embodiment, wherever appropriate. Likewise, any advantage of any of the embodiments can apply to any other embodiments, and vice versa. Other objects, features, and advantages of the enclosed embodiments will be apparent from the following description.

Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/ or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (JAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices.

Communicating wirelessly can involve transmitting and/ or receiving wireless signals using electromagnetic waves, radio waves, infrared waves, and/or other types of signals suitable for conveying information through air. Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc. Unless otherwise noted, the term "wireless device" is used interchangeably herein with the term "user equipment" (or "UE" for short).

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

As briefly mentioned above, a UE in RRC_CONNECTED state monitors PDCCH for DL scheduling assignments (e.g., for PDSCH), UL resource grants (e.g., for PUSCH), and for other purposes. Depending on discontinuous reception (DRX) configuration, in both LTE and NR, a UE may spend a substantial part of its energy on decoding PDCCH without detecting a DL scheduling assignment or UL resource grant directed to it. This can be addressed by sending a Wake-up Signal (WUS) that can be detected by the UE using much less energy relative to PDCCH detection. However, one disadvantage of WUS is relatively low robustness and/or reliability for UE detection, which can cause the UE and/or the network to perform various actions that can increase UE energy consumption, drop UE connections with the network, and waste network resources. This is discussed in more detail after the following description of NR network architectures and radio interface.

Figure 3:
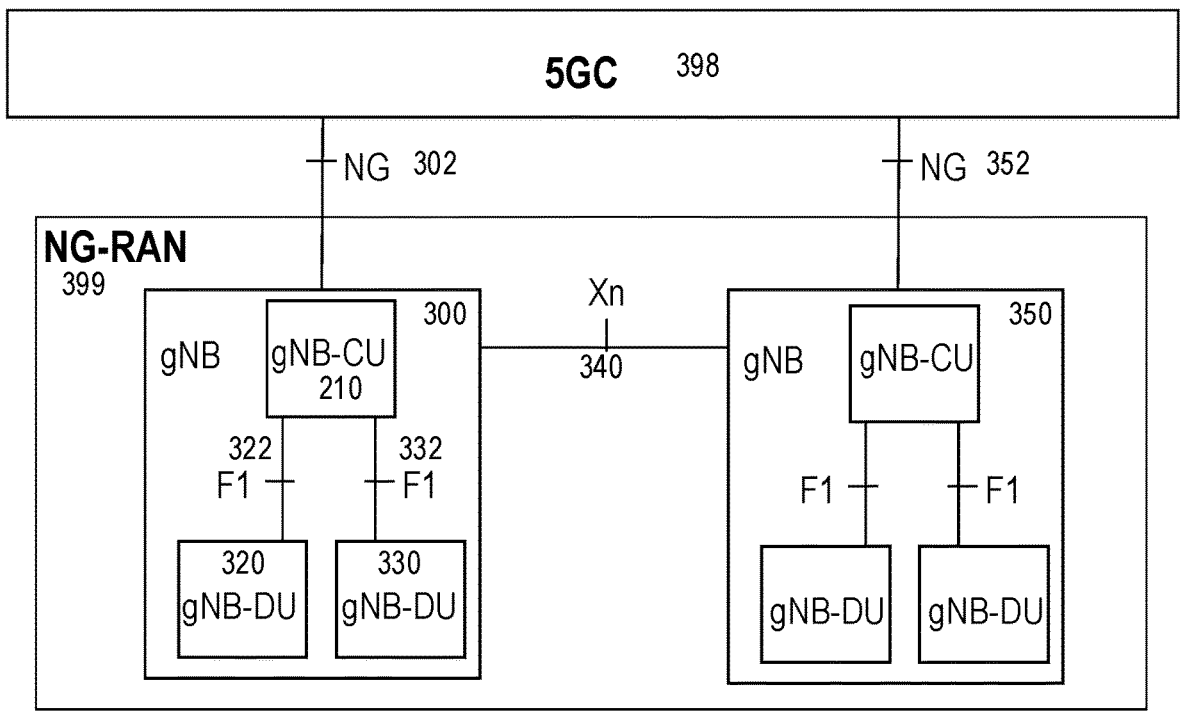
FIGS. 3-4 illustrate various exemplary aspects of a fifth generation (5G) New Radio (NR) network architecture.

FIG. 3 illustrates a high-level view of the 5G network architecture, consisting of a Next Generation RAN (NG-RAN) 399 and a 5G Core (5GC) 398. NG-RAN 399 can include a set of gNodeB's (gNBs) connected to the 5GC via one or more NG interfaces, such as gNBs 300, 350 connected via interfaces 302, 352, respectively. In addition, the gNBs can be connected to each other via one or more Xn interfaces, such as Xn interface 340 between gNBs 300 and 350. With respect the NR interface to UEs, each of the gNBs can support frequency division duplexing (FDD), time division duplexing (TDD), or a combination thereof.

NG-RAN 399 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region," which is defined in 3GPP TS 23.501. If security protection for CP and UP data on TNL of NG-RAN interfaces is supported, NDS/IP shall be applied.

The NG RAN logical nodes shown in FIG. 3 (and described in 3GPP TS 38.401 and 3GPP TR 38.801) include a central (or centralized) unit (CU or gNB-CU) and one or more distributed (or decentralized) units (DU or gNB-DU). For example, gNB 300 includes gNB-CU 310 and gNB-DUs 320 and 340. CUs (e.g., gNB-CU 310) are logical nodes that host higher-layer protocols and perform various gNB functions such controlling the operation of DUs. Each DU is a logical node that hosts lower-layer protocols and can include, depending on the functional split, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

Figure 4:
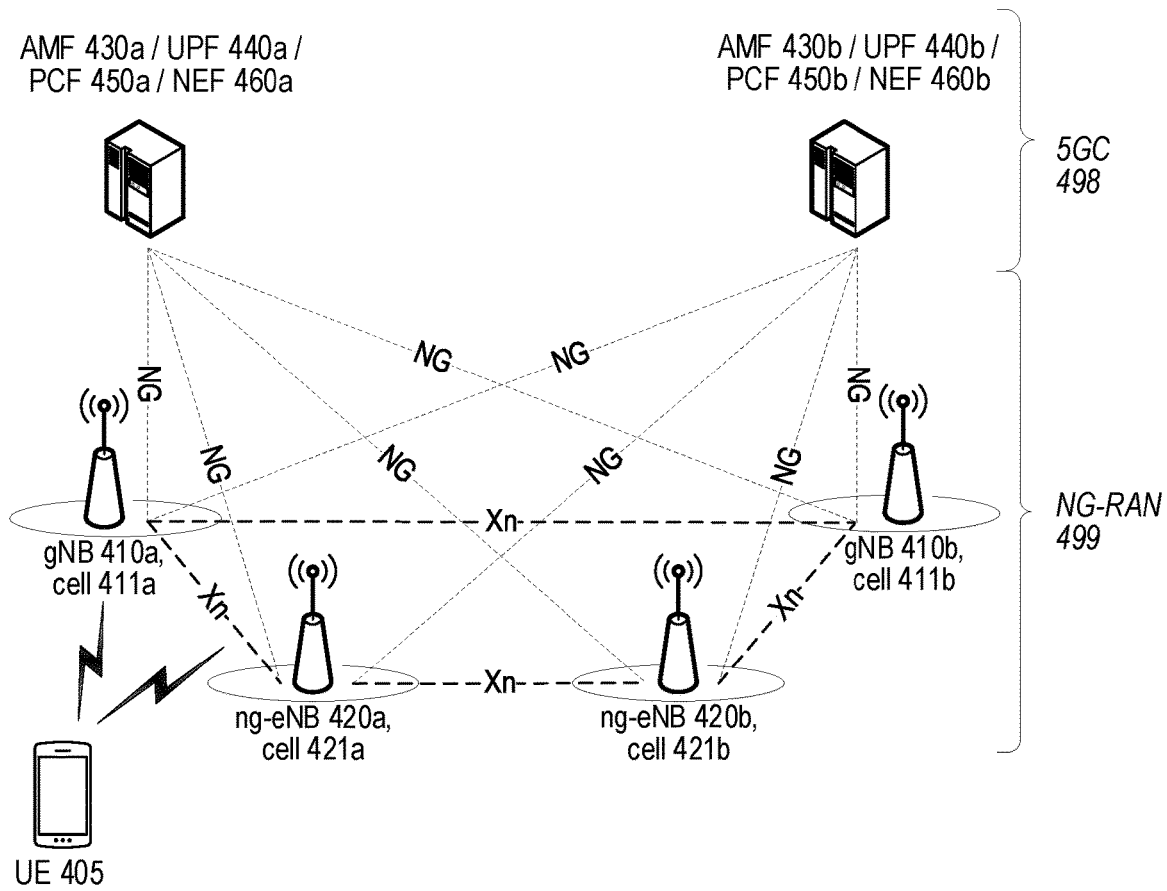

A gNB-CU connects to gNB-DUs over respective F1 logical interfaces, such as interfaces 322 and 332 shown in FIG. 3. The gNB-CU and connected gNB-DUs are only visible to other gNBs and the 5GC as a gNB. In other words, the F1 interface is not visible beyond gNB-CU. FIG. 4 shows a high-level view of an exemplary 5G network architecture, including a Next Generation Radio Access Network (NG-RAN) 499 and a 5G Core (5GC) 498. As shown in the figure, NG-RAN 499 can include gNBs 410 (e.g., 410a,b) and ng-eNBs 420 (e.g., 420a,b) that are interconnected with each other via respective Xn interfaces. The gNBs and ng-eNBs are also connected via the NG interfaces to 5GC 498, more specifically to the AMF (Access and Mobility Management Function) 430 (e.g., AMFs 430a,b) via respective NG-C interfaces and to the UPF (User Plane Function) 440 (e.g., UPFs 440a,b) via respective NG-U interfaces. Moreover, the AMFs 430a,b can communicate with one or more policy control functions (PCFs, e.g., PCFs 450a,b) and network exposure functions (NEFs, e.g., NEFs 460a,b).

Each of the gNBs 410 can support the NR radio interface including frequency division duplexing (FDD), time division duplexing (TDD), or a combination thereof. In contrast, each of ng-eNBs 420 can support the LTE radio interface but, unlike conventional LTE eNBs (such as shown in FIG. 1), connect to the 5GC via the NG interface. Each of the gNBs and ng-eNBs can serve a geographic coverage area including one more cells, including cells 411a-b and 421a-b shown as exemplary in FIG. 4. As mentioned above, the gNBs and ng-eNBs can also use various directional beams to provide coverage in the respective cells. Depending on the particular cell in which it is located, a UE 430 can communicate with the gNB or ng-eNB serving that particular cell via the NR or LTE radio interface, respectively.

Figure 5:
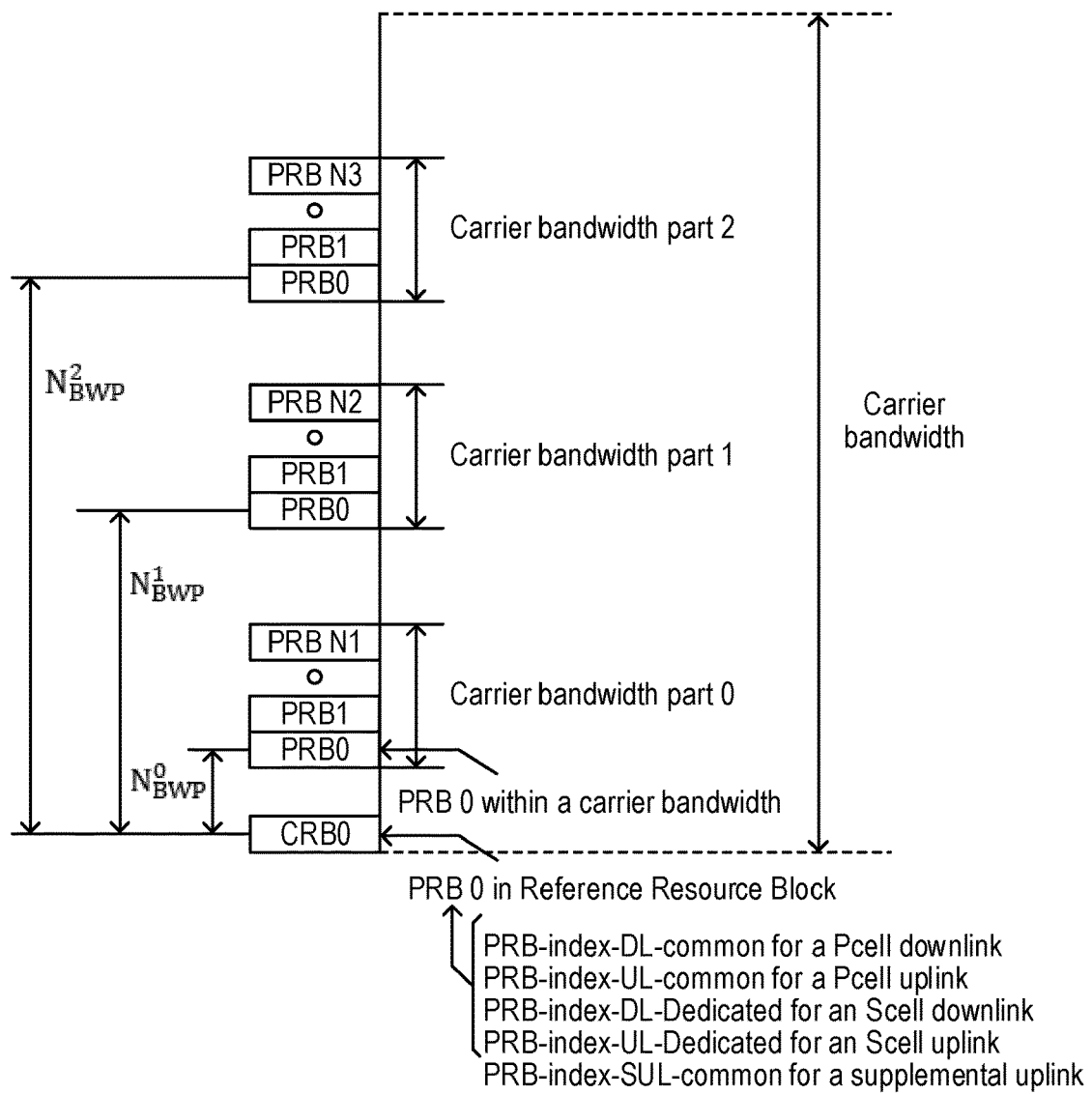
FIG. 5 shows an exemplary frequency-domain configuration for an NR UE.

FIG. 5 shows an exemplary frequency-domain configuration for an NR UE. In Rel-15 NR, a UE can be configured with up to four carrier bandwidth parts (BWPs) in the DL with a single DL BWP being active at a given time. A UE can be configured with up to four BWPs in the UL with a single UL BWP being active at a given time. If a UE is configured with a supplementary UL, the UE can be configured with up to four additional BWPs in the supplementary UL, with a single supplementary UL BWP being active at a given time.

Common RBs (CRBs) are numbered from 0 to the end of the system bandwidth. Each BWP configured for a UE has a common reference of CRB 0, such that a particular configured BWP may start at a CRB greater than zero. In this manner, a UE can be configured with a narrow BWP (e.g., 10 MHz) and a wide BWP (e.g., 100 MHz), each starting at a particular CRB, but only one BWP can be active for the UE at a given point in time.

Within a BWP, RBs are defined and numbered in the frequency domain from 0 to $N_{BWPi}^{size}-1$, where i is the index of the particular BWP for the carrier. Similar to LTE, each NR resource element (RE) corresponds to one OFDM subcarrier during one OFDM symbol interval. NR supports various SCS values $\Delta f=(15\times 2^\mu)$ kHz, where $\mu \in (0, 1, 2, 3, 4)$ are referred to as "numerologies." Numerology $\mu=0$ (i.e., $\Delta f=15$ kHz) provides the basic (or reference) SCS that is also used in LTE. The symbol duration, cyclic prefix (CP) duration, and slot duration are inversely related to SCS or numerology. For example, there is one (1-ms) slot per subframe for $\Delta f=15$ kHz, two 0.5-ms slots per subframe for $\Delta f=30$ kHz, etc. In addition, the maximum carrier bandwidth is directly related to numerology according to $2^\mu * 50$ MHz.

Table 1 below summarizes the supported NR numerologies and associated parameters. Different DL and UL numerologies can be configured by the network.

TABLE 1

| $\mu$ | $\Delta f = 2^\mu \cdot 15$ (kHz) | Cyclic prefix (CP) | CP duration | Symbol duration | Symbol + CP | Slot duration | Max carrier BW |
|---|---|---|---|---|---|---|---|
| 0 | 15 | Normal | 4.69 μs | 66.67 μs | 71.35 μs | 1 ms | 50 MHz |
| 1 | 30 | Normal | 2.34 μs | 33.33 μs | 35.68 μs | 0.5 ms | 100 MHz |
| 2 | 60 | Normal, Extended | 1.17 μs | 16.67 μs | 17.84 μs | 0.25 ms | 200 MHz |
| 3 | 120 | Normal | 0.59 μs | 8.33 μs | 8.92 μs | 125 μs | 400 MHz |
| 4 | 240 | Normal | 0.29 μs | 4.17 μs | 4.46 μs | 62.5 μs | 800 MHz |

Figure 6:
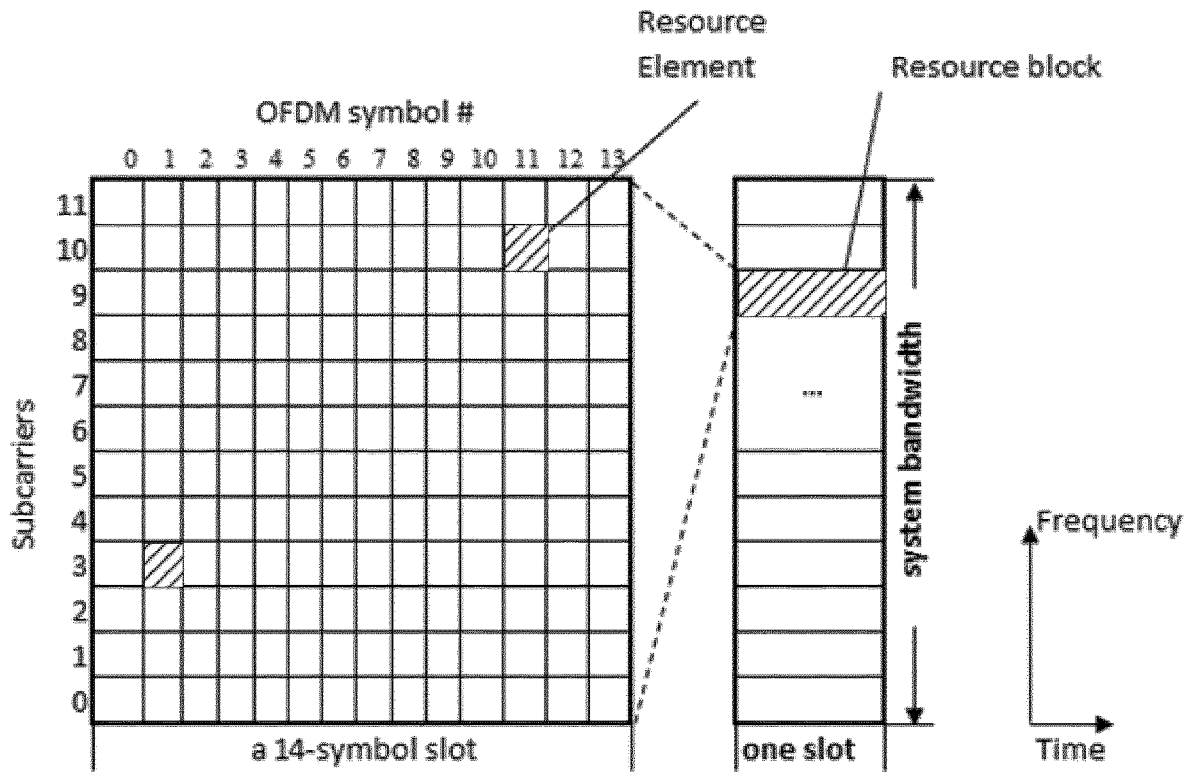
FIG. 6 shows an exemplary time-frequency resource grid for an NR slot.

FIG. 6 shows an exemplary time-frequency resource grid for an NR slot. As illustrated in FIG. 6, a resource block (RB) consists of a group of 12 contiguous OFDM subcarriers for a duration of a 14-symbol slot. Like in LTE, a resource element (RE) consists of one subcarrier in one slot. An NR slot can include 14 OFDM symbols for normal cyclic prefix and 12 symbols for extended cyclic prefix.

Figure 7A:
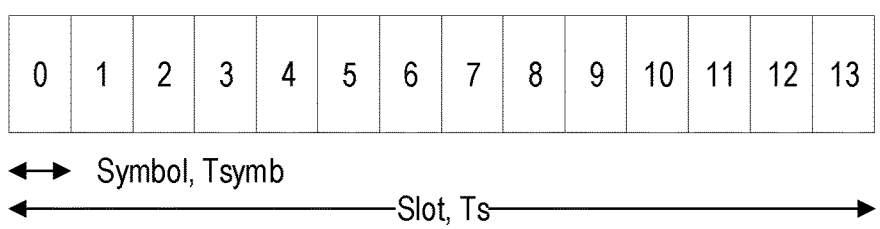
FIGS. 7A-7B shows various exemplary NR slot configurations.

FIG. 7A shows an exemplary NR slot configuration comprising 14 symbols, where the slot and symbols durations are denoted $T_s$ and $T_{symb}$, respectively. In addition, NR includes a Type-B scheduling, also known as "mini-slots." These are shorter than slots, typically ranging from one symbol up to one less than the number of symbols in a slot (e.g., 13 or 11), and can start at any symbol of a slot. Mini-slots can be used if the transmission duration of a slot is too long and/or the occurrence of the next slot start (slot alignment) is too late. Applications of mini-slots include unlicensed spectrum and latency-critical transmission (e.g., URLLC). However, mini-slots are not service-specific and can also be used for eMBB or other services.

Figure 7B:
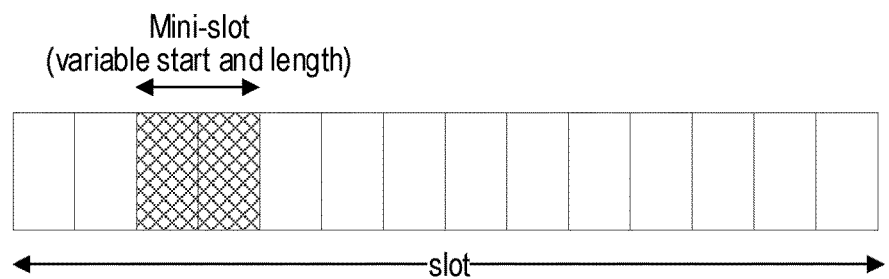

FIG. 7B shows another exemplary NR slot structure comprising 14 symbols. In this arrangement, PDCCH is confined to a region containing a particular number of symbols and a particular number of subcarriers, referred to as the control resource set (CORESET). In the exemplary structure shown in FIG. 7B, the first two symbols contain PDCCH and each of the remaining 12 symbols contains physical data channels (PDCH), i.e., either PDSCH or PUSCH. Depending on the particular CORESET configuration (discussed below), however, the first two slots can also carry PDSCH or other information, as required.

A CORESET includes multiple RBs (i.e., multiples of 12 REs) in the frequency domain and 1-3 OFDM symbols in the time domain, as further defined in 3GPP TS 38.211 § 7.3.2.2. A CORESET is functionally similar to the control region in LTE subframe. In NR, however, each REG consists of all 12 REs of one OFDM symbol in an RB, whereas an LTE REG includes only four REs. The CORESET time domain size can be configured by an RRC parameter. In LTE, the frequency bandwidth of the control region is fixed (i.e., to the total system bandwidth), whereas in NR, the frequency bandwidth of the CORESET is variable. CORESET resources can be indicated to a UE by RRC signaling.

The smallest unit used for defining CORESET is the REG, which spans one PRB in frequency and one OFDM symbol in time. In addition to PDCCH, each REG contains demodulation reference signals (DM-RS) to aid in the estimation of the radio channel over which that REG was transmitted. When transmitting the PDCCH, a precoder can be used to apply weights at the transmit antennas based on some knowledge of the radio channel prior to transmission. It is possible to improve channel estimation performance at the UE by estimating the channel over multiple REGs that are proximate in time and frequency, if the precoder used at the transmitter for the REGs is not different. To assist the UE with channel estimation, the multiple REGs can be grouped together to form a REG bundle, and the REG bundle size for a CORESET (i.e., 2, 3, or 5 REGs) can be indicated to the UE. The UE can assume that any precoder used for the transmission of the PDCCH is the same for all the REGs in the REG bundle.

An NR control channel element (CCE) consists of six REGs. These REGs may either be contiguous or distributed in frequency. When the REGs are distributed in frequency, the CORESET is said to use interleaved mapping of REGs to a CCE, while if the REGs are contiguous in frequency, a non-interleaved mapping is said to be used. Interleaving can provide frequency diversity. Not using interleaving is beneficial for cases where knowledge of the channel allows the use of a precoder in a particular part of the spectrum improve the SINR at the receiver.

Similar to LTE, NR data scheduling can be performed dynamically, e.g., on a per-slot basis. In each slot, the base station (e.g., gNB) transmits downlink control information (DCI) over PDCCH that indicates which UE is scheduled to receive data in that slot, as well as which RBs will carry that data. A UE first detects and decodes DCI and, if the DCI includes DL scheduling information for the UE, receives the corresponding PDSCH based on the DL scheduling information. DCI formats 1_0 and 1_1 are used to convey PDSCH scheduling.

Likewise, DCI on PDCCH can include UL grants that indicate which UE is scheduled to transmit data on PUCCH in that slot, as well as which RBs will carry that data. A UE first detects and decodes DCI and, if the DCI includes an uplink grant for the UE, transmits the corresponding PUSCH on the resources indicated by the UL grant. DCI formats 0_0 and 0_1 are used to convey UL grants for PUSCH, while Other DCI formats (2_0, 2_1, 2_2 and 2_3) are used for other purposes including transmission of slot format information, reserved resource, transmit power control information, etc.

In NR Rel-15, the DCI formats 0_0/1_0 are referred to as "fallback DCI formats," while the DCI formats 0_1/1_1 are referred to as "non-fallback DCI formats." The fallback DCI support resource allocation type 1 in which DCI size depends on the size of active BWP. As such DCI formats 0_1/1_1 are intended for scheduling a single transport block (TB) transmission with limited flexibility. On the other hand, the non-fallback DCI formats can provide flexible TB scheduling with multi-layer transmission.

A DCI includes a payload complemented with a Cyclic Redundancy Check (CRC) of the payload data. Since DCI is sent on PDCCH that is received by multiple UEs, an identifier of the targeted UE needs to be included. In NR, this is done by scrambling the CRC with a Radio Network Temporary Identifier (RNTI) assigned to the UE. Most commonly, the cell RNTI (C-RNTI) assigned to the targeted UE by the serving cell is used for this purpose.

DCI payload together with an identifier-scrambled CRC is encoded and transmitted on the PDCCH. Given previously configured search spaces, each UE tries to detect a PDCCH addressed to it according to multiple hypotheses (also referred to as "candidates") in a process known as "blind decoding." PDCCH candidates span 1, 2, 4, 8, or 16 CCEs, with the number of CCEs referred to as the aggregation level (AL) of the PDCCH candidate. If more than one CCE is used, the information in the first CCE is repeated in the other CCEs. By varying AL, PDCCH can be made more or less robust for a certain payload size. In other words, PDCCH link adaptation can be performed by adjusting AL. Depending on AL, PDCCH candidates can be located at various time-frequency locations in the CORESET.

A hashing function can be used to determine the CCEs corresponding to PDCCH candidates that a UE must monitor within a search space set. The hashing is done differently for different UEs. In this manner, the CCEs used by the UEs are randomized and the probability of collisions between multiple UEs having messages included in a CORESET is reduced. A monitoring periodicity is also configured for different PDCCH candidates. In any particular slot, the UE may be configured to monitor multiple PDCCH candidates in multiple search spaces which may be mapped to one or more CORESETs. PDCCH candidates may need to be monitored multiple times in a slot, once every slot or once in multiple of slots.

Once a UE decodes a DCI, it de-scrambles the CRC with RNTI(s) that is(are) assigned to it and/or associated with the particular PDCCH search space. In case of a match, the UE considers the detected DCI addressed to it and follows the instructions (e.g., scheduling information) contained in the DCI.

For example, to determine the modulation order, target code rate, and TB size(s) for a scheduled PDSCH transmission, the UE first reads the five-bit modulation and coding scheme field ($I_{MCS}$) in the DCI (e.g., formats 1_0 or 1_1) to determine the modulation order ($Q_m$) and target code rate (R) based on the procedure defined in 3GPP TS 38.214 V15.0.0 clause 5.1.3.1. Subsequently, the UE reads the redundancy version field (rv) in the DCI to determine the redundancy version. Based on this information together with the number of layers (v) and the total number of allocated PRBs before rate matching ($n_{PRB}$), the UE determines the TB Size (TBS) for the PDSCH according to the procedure defined in 3GPP TS 38.214 V15.0.0 clause 5.1.3.2.

DCI can also include information about various timing offsets (e.g., in slots or subframes) between PDCCH and PDSCH, PUSCH, HARQ, and/or CSI-RS. For example, offset K0 represents the number of slots between the UE's PDCCH reception of a PDSCH scheduling DCI (e.g., formats 1_0 or 1_1) and the subsequent PDSCH transmission. Likewise, offset K1 represents the number of slots between this PDSCH transmission and the UE's responsive HARQ ACK/NACK transmission on the PUSCH. In addition, offset K3 represents the number of slots between this responsive ACK/NACK and the corresponding retransmission of data on PDSCH. In addition, offset K2 represents the number of slots between the UE's PDCCH reception of a PUSCH grant DCI (e.g., formats 0_0 or 0_1) and the subsequent PUSCH transmission. Each of these offsets can take on values of zero and positive integers.

For NR, these scheduling offsets can be larger than zero, which facilitates both same-slot (zero offset) and cross-slot (non-zero offset) scheduling. For example, cross-slot scheduling may be desirable for facilitating UE power savings by adaptively changing between upper and lower BWPs for PDCCH and PDSCH, respectively.

Finally, DCI format 0_1 can also include a network request for a UE report of channel state information (CSI) or channel quality information (CQI). Prior to sending this report, the UE receives and measures CSI-RS transmitted by the network. The parameter aperiodicTriggeringOffset represents the integer number of slots between the UE's reception of a DCI including a CSI request and the network's transmission of the CSI-RS. This parameter can take on values 0-4.

Offset K0 is part of a UE's PDSCH time-domain resource allocation (TDRA) provided by the network node. Also included in the PDSCH TDRA is a slot length indicator values (SLIV), which identifies a particular combination of a starting symbol (S) and a length (L) of the time-domain allocation for PDSCH. In general, S can be any symbol 0-13 and L can be any number of symbols beginning with S until the end of the slot (i.e., symbol 13). The SLIV can be used as a look-up table index to find the associated (S, L) combination. Similarly, the network sends offset K2 as part of a UE's PUSCH TDRA, which also includes a corresponding SLIV.

When a UE is in RRC_IDLE or RRC_INACTIVE modes, it monitors PDCCH periodically to check for scheduling of paging requests to be subsequently transmitted on PDSCH. In RRC_CONNECTED mode, a UE monitors PDCCH for UL/DL data scheduling on PDSCH/PUSCH as well as for other purposes. In between these monitoring occasions, the UE can go to sleep to reduce energy consumption. This sleep-wake cycle is known as "discontinuous reception" or DRX. The amount of UE power savings is related to wake period ("DRX On") duration as a fraction of the entire DRX duty cycle. The following discussion relates generally to DRX operations while the UE is on RRC_CONNECTED mode, but the terms "DRX" and "C-DRX" (connected-mode DRX) are used interchangeably unless specifically noted to the contrary.

Figure 8:
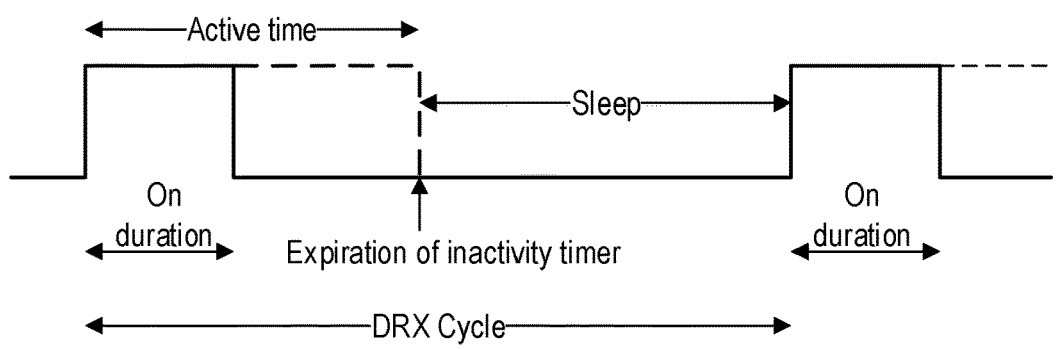
FIG. 8 shows a timing diagram that illustrates exemplary user equipment (UE) discontinuous reception (DRX) operation.

At a high level, DRX allows a UE to transition to lower power state whenever it is not required to receive any transmission from the network (e.g., gNB). FIG. 8 shows a timing diagram that illustrates exemplary DRX operation. As shown in FIG. 8, DRX operation is based on a DRX cycle, an On duration, and an inactivity timer (other parameters can be used but are omitted here for simplicity of explanation). The UE is awake and monitors PDCCH during the On duration. If no valid DCI addressed to the UE is detected during the On duration, the UE stops PDCCH monitoring until next occurrence of the On duration. On the other hand, if a valid DCI addressed to the UE is detected during the On duration, the UE initiates the inactivity timer and continues to monitor PDCCH until either the UE again detects valid DCI addressed to it or the inactivity timer expires.

The period from the beginning of the On duration until inactivity timer expiration can be referred to as "active time." If the UE receives a valid DCI while the inactivity timer is running, it extends the inactivity timer and continues to monitor PDCCH. On the other hand, if the inactivity timer expires, the UE can stop PDCCH monitoring until the end of the DRX cycle and go to sleep until the beginning of the next DRX cycle.

It is known that for LTE, depending on DRX setting, a UE may spend a substantial part of its stored energy on decoding PDCCH without detecting a PDSCH/PUSCH scheduled for it. The situation can be similar in NR with similar DRX configuration, since a UE will still need to perform blind detection in its CORESETs to identify whether there is a PDCCH targeted to it.

As used herein, a WUS—also referred to as Wake-up-DCI (WU-DCI)—is a DCI transmission on a regular PDCCH that does not schedule PDSCH/PUSCH data or carry conventional DL control signaling. The CRC may be scrambled with the C-RNTI of the targeted UE or a WUG-RNTI (wake-up group RNTI) with which the UE has been configured. For example, when a UE is configured with a WUG-RNTI it belongs to this specific WU-group and can be awakened by a DCI addressed to this WUG-RNTI. A UE can also be configured to monitor WUS with either C-RNTI or WUG-RNTI.

In such case, the WU-DCI can carry dummy data and a targeted UE receives the WU message by a successful CRC check using its C-RNTI or an assigned WUG-RNTI. Alternatively, the WU-DCI may also carry additional information to the targeted UE, or a UE group, to instruct the UE to perform some subsequent action. The search space for WU-DCI may be common or UE-specific. To reduce UE blind decoding attempts and resulting energy, the search space(s) where WUS-DCI can be transmitted are typically very limited so that UE only has to test for one, or a small number of, RE hypothesis(es).

Even within WUS search spaces limited in such ways, the UE can still fail to detect a WUS directed to it (or to a group of which it is a member). If this occurs, the UE will not wake up to receive the associated PDCCH that will be transmitted by the network (e.g., serving gNB). As such, the network will waste resources transmitting the PDCCH to a UE that is not listening. The network will eventually discover this problem and retransmit the PDCCH information (e.g., accompanied by another WUS), but this requires additional network resources and results in latency or delay in delivery of the PDCCH payload to the UE. Moreover, this can also delay operations that the UE performs in response to receiving the WUS and/or PDCCH, such as transmitting reference signals.

Figure 9:
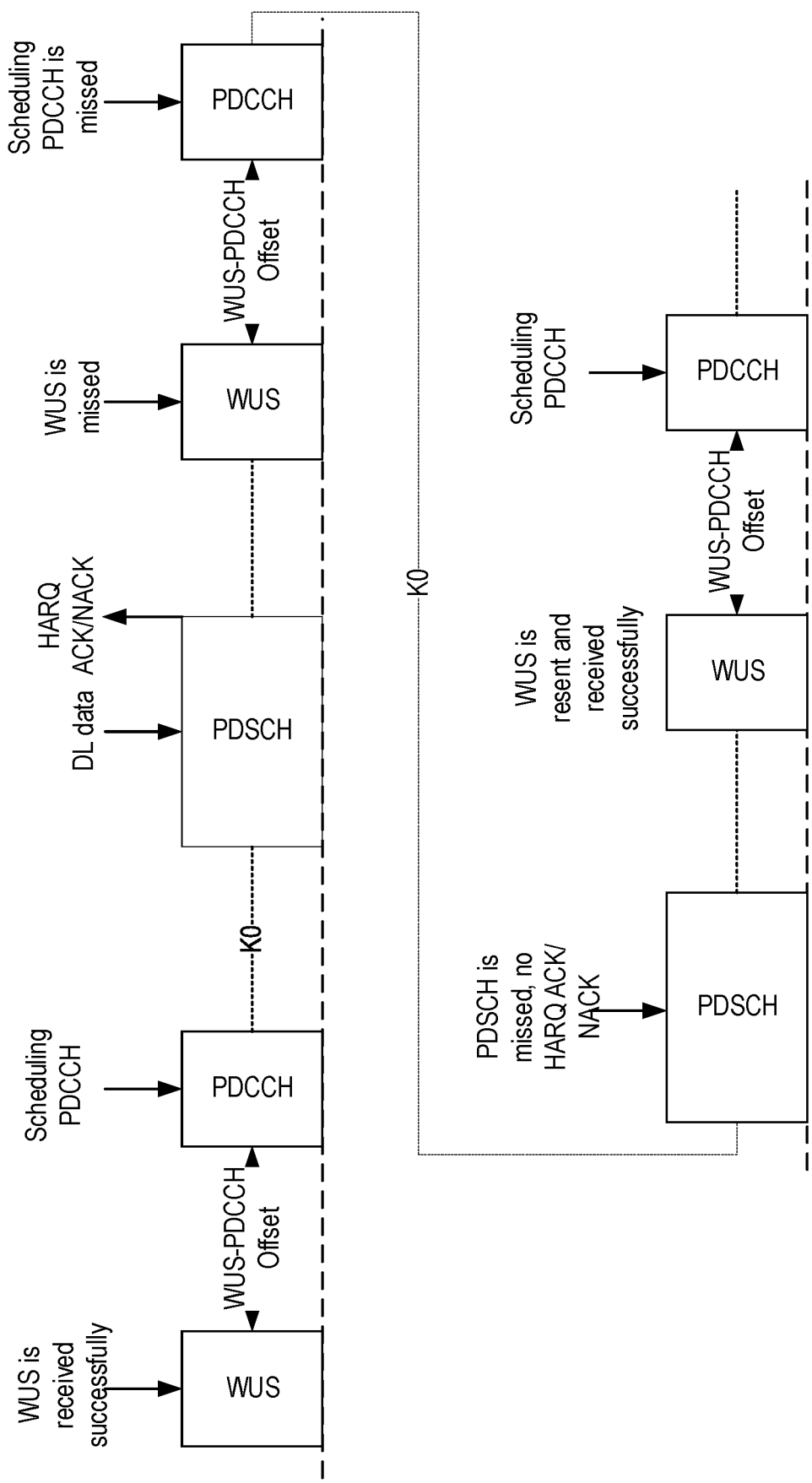
FIG. 9 shows an exemplary timeline illustrating wake-up signal (WUS) transmission in advance of a scheduling physical downlink control channel (PDCCH).

FIG. 9 shows an exemplary timeline illustrating WUS transmission in advance of scheduling PDCCH. Beginning from the top left, the UE successfully receives the first WUS and the associated scheduling PDCCH. The UE subsequently receives the scheduled PDSCH (e.g., containing DL data) and responds with a HARQ ACK/NACK as appropriate. However, the UE fails to detect the second WUS and, consequently, misses the subsequent scheduling PDCCH. Since the UE is unaware of the missed WUS and PDCCH, the network transmits the scheduled PDSCH. But having missed both the WUS and the scheduling PDCCH, the UE also misses the PDSCH and does not respond with HARQ ACK/NACK. This may be repeated a number of times, but eventually the UE successfully receives a final WUS and PDCCH transmission by the network, as shown in the figure.

In general, current WUS mechanisms address how the UE should behave in when the UE receives the intended indication from the network, but fail to provide mechanisms to detect and recover from WUS miss detection, where the UE misinterprets the intention of the network. In the following, the terms "WUS miss detection," "missed WUS detection," and "missed detection of WUS" refer to situations where the network has transmitted a WUS intended for the UE, but the UE has failed to successfully receive and detect it. Similarly, the terms "PDCCH miss detection," "missed PDCCH detection," and "missed detection of PDCCH" refer to situations where the network has transmitted a PDCCH intended for the UE, but the UE has failed to successfully receive and/or detect it.

Currently, the network can declare a radio link failure (RLF) after UE has not responded to a number of scheduled PDSCH, presumably due to missed detection of PDCCH. As such, if the UE in DRX misses a WUS, the UE may also miss multiple PDCCH signals since it is not aware that the network is transmitting them. This can result in the declaration of RLF and release of the UE connection. As a result, the UE must subsequently reestablish the connection with the network, which results in increased UE energy consumption, increased delays for data transmission/reception, and excessive use of network resources.

Accordingly, exemplary embodiments of the present disclosure address these and other problems, issues, and/or drawbacks by providing novel WUS miss detection and recovery mechanisms. For example, such embodiments provide mechanisms for the network to distinguish between missed WUS and missed PDCCH detection events for a UE, as well as mechanisms to efficiently recover from a missed WUS detection. In this manner, exemplary embodiments reduce and/or minimize the cost of WUS miss detection for both the UE and the network.

At a high level, exemplary embodiments of the present disclosure can be divided into first and second groups. In the first group of embodiments, the network can discover a missed WUS detection by failing to receive expected feedback from the UE. The network can trigger the UE to provide the feedback in various ways. In some embodiments, the network can configure and/or schedules the UE to send an acknowledgment (referred to as "WUS-ACK") when the UE detects a WUS intended for it. In other embodiments, the network can discover a missed WUS detection by scheduling and/or triggering the UE to send another signal or message, such as an aperiodic CSI report or a hybrid ARQ (HARQ) ACK/NACK in response to a PDSCH transmission from the network.

In the first group of embodiments, the network interprets lack of feedback from the UE as missed WUS detection by the UE. In such embodiments, it is up to the network to decide which UEs to be configured/scheduled/triggered for feedback. For example, the network may decide to not configure a UE with a feedback if the UE has good channel conditions, as evidenced by UE CSI reports, etc.

In the second group of embodiments, the network can perform certain operations for recovery from missed WUS detection by the UE. In some embodiments, the network can override the default RLF mechanism. For example, based on inferring missed PDCCH detection, the network can retransmit WUS one or more times, and wait for multiple missed WUS detections before declaring RLF. In other embodiments, the network can retransmit a more robust WUS in the UE's next WUS reception occasion. For example, the network can select a higher AL than for the initial WUS, thereby facilitating increased redundancy of the detectable information in the subsequent WUS(s). As another example, the network can increase the power level used to transmit the subsequent WUS (e.g., relative to power level used to send initial WUS), and/or reduce the power of other signals that could be interfering with the UE's WUS reception. As another example, the network can transmit the subsequent WUS using different time/frequency resources (e.g., RBs, symbols) than the initial WUS, which can mitigate the effects of frequency-selective fading on the WUS reception. Moreover, any of these exemplary techniques can be used in combination for subsequent WUS transmissions to the UE.

In other embodiments of the second group, the network can configure the UE with reception parameters that mitigate the effects of missed WUS detection. For example, the network can configure some unconditional ON durations where the UE must monitor PDCCH independent of WUS detection. As another example, the configure the UE with additional WUS reception occasions within or outside the UE's normal DRX On duration, and retransmit the WUS in one or more of these occasions, in case the UE has missed the initial WUS transmission.

The first group of embodiments will now be described in more detail.

In some embodiments, the NW can configure the UE to send a WUS-ACK after receiving a WUS. Such configuration can be provided in advance to the UE via higher layer signaling (e.g., semi-static, MAC, RRC). Alternately, the network can request for WUS-ACK individually (i.e., per WUS) by including an indicator in the WUS.

In some embodiments, the UE can send the WUS-ACK over PUCCH using any of the PUCCH formats. Alternatively, the UE can send the WUS-ACK multiplexed with UL data over PUSCH. In such embodiments, a WUS-ACK configuration or scheduling becomes necessary. For example, the network can pre-configure the UE (e.g., via RRC signaling) with a delay between WUS reception and WUS-ACK transmission, as well as the resources (e.g., RBs) and configuration (e.g., modulation and coding scheme, MCS) to be used for WUS-ACK transmission. As another example, the WUS-DCI can schedule the UE with the necessary resources for the WUS-ACK. Alternatively, a combination of these two options is also possible, such as the network preconfiguring the UE with the delay and providing resources and other configuration via WUS-DCI. Another possible combination is to have pre-configure the UE with a list of multiple WUS-ACK configurations, with the WUS-DCI indicate a selection of a WUS-ACK configuration from the list.

In some embodiments, the WUS-ACK can be scheduled X slots/symbols before or after the beginning of the network C-DRX On-duration. Furthermore, configuration/scheduling of WUS-ACK can be UE-specific or can be shared by multiple UEs. If WUS-ACK configuration/scheduling is UE-specific, PUCCH formats 0 or 1 can be considered as options, while if a larger number of UEs can share the same PUCCH for WUS-ACK, PUCCH formats 2, 3, or 4 can be used.

The WUS-ACK configuration can also depend on whether WUS-DCI addresses only one UE or a group of UEs. If WUS-DCI addresses only a single UE, the associated fields scheduling WUS-ACK also targets only that UE. On the other hand, if a group of UEs share the same WUS-DCI, then the WUS-ACK scheduling fields should be configured to accommodate UE-specific or group-specific WUS-ACKs. For example, a bit field (e.g., one bit for each UE in a group) within WUS-DCI can indicate which UE(s) should wake-up and include additional information regarding WUS-ACK resources. As another example, bit fields related to additional commands triggering a UE feedback can be separated from the bit fields indicating which UE(s) should wake up. If the WUS-ACK is associated with multiple UEs indicated in the same WUS-DCI, and WUS-ACK configuration/scheduling is supposed to be similar, it can be applied to all the associated UEs with the same field in WUS-DCI.

In other embodiments, the WUS-ACK may be implied by and/or inferred from the UE's acknowledgement of the first transmission in DRX On duration, rather than an explicit WUS-ACK signal. This approach has the benefit of not requiring any additional UL signaling overhead when WUS is successfully received. In these embodiments, reception of WUS indicates to the UE that a scheduling PDCCH will be present in a predetermined slot of the DRX On duration (e.g., the first slot). If the UE receives the WUS, it is immediately aware that a scheduling PDCCH will be transmitted in the predetermined slot and it will transmit an ACK/NACK in the appropriate slot. For example, the UE will transmit an ACK after PDSCH if PDCCH and PSDCH are successfully received, a NACK in the predetermined slot (i.e., of the DRX On duration) if PDCCH is not detected, or a NACK after PDSCH if PDCCH is detected but PDSCH is not detected. The presence of this ACK/NACK signaling in the predetermined slot or the slot after PDSCH will be interpreted by the network as a WUS-ACK. On the other hand, if the UE does not receive a WUS, then it will not transmit any ACK/NACK in those slots, which the network will interpret as a WUS-NACK.

In such embodiments, the UE can be pre-configured for WUS ACK/NACK transmission, or a particular format and/or content of a WUS can be used to dynamically request and/or indicate such WUS acknowledgement for each DRX On duration. The configuration can be especially beneficial for low-to-medium loaded networks where the first slot of the DRX On duration is likely available for PDCCH transmission.

In other embodiments, the UE can transmit a WUS NACK only if a WUS is not detected by the UE in the corresponding reception occasion. If the WUS is received, no additional signaling is performed by the UE; the absence of WUS NACK is interpreted by the network as a WUS-ACK (e.g., of the WUS reception). This approach may be configured preferably if the UE is scheduled in a majority of its DRX On durations.

In other embodiments, the network can use WUS-DCI to trigger a feedback from the UE X slots before or after the UE's DRX On duration, X≥0. For example, the WUS-DCI can be used to trigger an aperiodic CSI (A-CSI) report from the UE, the reception of which can be interpreted by the network as a WUS-ACK. As another example, the network can use WUS-DCI to schedule a PDSCH during the UE's DRX On duration. The WUS-DCI can also include resource assignment for the scheduled PDSCH. In response to receiving the PDSCH, the UE is expected to send a HARQ ACK/NACK. The network can interpret this HARQ ACK/NACK as a WUS-ACK, and the absence of this this HARQ ACK/NACK as a WUS-NACK.

In embodiments where the WUS-DCI addresses a single UE, additional bit fields can be included in the WUS-DCI triggering A-CSI or scheduling a PDSCH. In embodiments where the WUS-DCI addresses a group of UEs (unless used for multicast/broadcast services), then additional fields need to be included in WUS-DCI for each UE to trigger a CSI report or schedule a PDSCH.

In some embodiments, the network can infer WUS feedback from periodic CSI reporting by a UE. In general, the network can configure the UE with periodic CSI measurement and reporting via higher-layer (e.g., RRC) signaling at any time the UE is in contact with the network (e.g., has an existing RRC connection). In various embodiments, at least a portion of the UE's configured periodic CSI reporting occasions coincide with the UE's DRX On durations. Although the UE has to perform CSI-related measurements independent of WUS detection, the UE's CSI reporting characteristics in relation to DRX On durations are dependent on the network configuration according to various embodiments describe in more detail below.

In some embodiments, the network can configure the UE's periodic CSI reports to include L1-RSRP reports and optionally additional information based on the UE's WUS detection. In general, when DRX is configured, the UE does not typically provide CSI reports to the network unless woken by WUS. However, it is possible for the network to specifically configure the UE to provide CSI reports including only L1-RSRP during a DRX On duration for which the UE has not been woken up WUS. For example, the network can configure the UE in this manner by setting the RRC parameter ps-TransmitPeriodicL1-RSRP to true. The L1-RSRP reports (and optional additional information) can be for particular resources identified in the configuration.

Subsequently, the network can detect a WUS misdetection by the UE based on the contents of the UE's CSI report. In other words, if the network transmits a WUS intended for the UE but the UE's subsequent CSI report only contains L1-RSRP for the particular resources, the network can determine that the UE failed to detect the earlier WUS intended for the UE. In other words, if the UE detected the earlier WUS intended for it, the UE would have provided a complete CSI report for the particular resources, including L1-RSRP and the additional information.

In other embodiments, the network can base its WUS misdetection logic on a combination of CSI reports and PDSCH/PUSCH scheduling. In order to do this, the network can configure the UE with a periodic CSI report that occurs during the UE's DRX On duration independent of whether the UE is awakened by a detected WUS. For example, the network can configure the UE in this manner by setting one or more of RRC parameters ps-Periodic_CSI_Transmit and ps-TransmitPeriodicL1-RSRP to true. During the UE's DRX On duration, the network can detect a UE WUS miss detection when the UE reports CSI but does not respond to one or more scheduling PDCCHs intended for the UE. In this manner, the network can infer that the UE is still connected but most like missed a WUS.

In various embodiments based on UE periodic CSI reporting, in order to save network and/or UE resources and avoid UL traffic, the network can dynamically configure (e.g., turn on/off) periodic CSI reporting for each UE on an as-needed basis, e.g., when one or more conditions are met by a particular UE. The network can perform the dynamic configuration signaling via DCI, MAC CE, RRC, or a combination thereof. Some example conditions for when the network can turn on periodic CSI reports during a particular UE's DRX On duration include:

when the UE has recently reported low RSRP values, e.g., within some predetermined period before a DRX On duration;

when the UE is determined to be moving at a relatively high speed;

when the UE frequently switches between beams in one or more cells; and/or when the UE is in a location where radio conditions are known to be problematic and/or difficult (e.g., bad coverage, high interference, etc.). The UE's problematic location can be determined based on the UE being in a problematic beam and/or on UE- or network-centric determination of the UE's actual geographic location (e.g., via GNSS).

In some embodiments, in addition to dynamic configuration of periodic CSI reports, the network can also configure the UE with a default periodic CSI reports that is always active with low periodicity. The default periodic CSI reports can serve as a backup for network WUS miss detection in case the UE does not receive the network signaling that dynamically turns on the primary periodic CSI reporting.

The embodiments related to periodic CSI reporting described above can be further illustrated with reference to FIGS. 10-11, which show exemplary methods (e.g., procedures) performed by a network node and a UE, respectively. Put differently, various features of the operations described below correspond to various embodiments described above.

Figure 10:
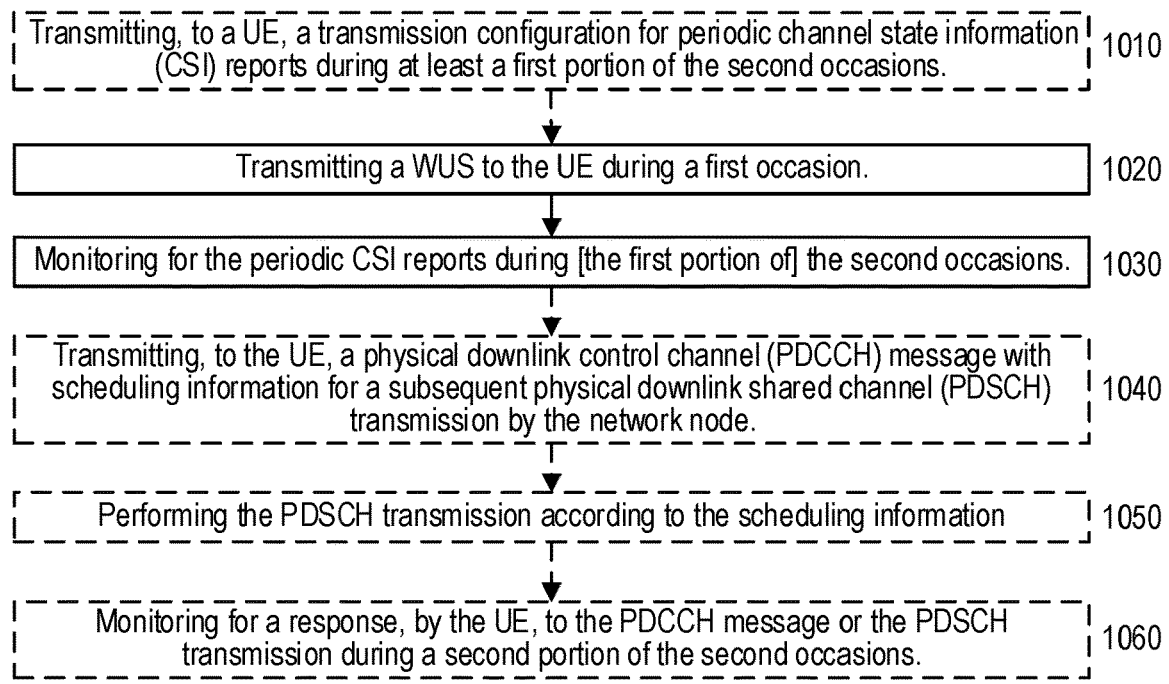
FIG. 10 shows a flow diagram of an exemplary method (e.g., procedure) performed by a network node (e.g., base station, gNB, eNB, etc. or component thereof) in a radio access network (RAN), according to various exemplary embodiments of the present disclosure.

FIG. 10 shows a flow diagram of an exemplary method (e.g., procedure) for selective transmission of a wake-up signal (WUS) to a user equipment (UE), according to various exemplary embodiments of the present disclosure. The exemplary method can be performed by a network node (e.g., base station, eNB, gNB, ng-eNB, CU/DU, etc., or component thereof) of a radio access network (RAN, e.g., E-UTRAN, NG-RAN). Also, the exemplary method shown in FIG. 10 can be used cooperatively with other exemplary methods described herein (e.g., FIG. 11) to provide various exemplary benefits described herein. Although FIG. 10 shows specific blocks in a particular order, the operations of the exemplary method can be performed in a different order than shown and can be combined and/or divided into blocks having different functionality than shown. Optional blocks or operations are indicated by dashed lines.

The exemplary method shown in FIG. 10 can include the operations of block 1020, where the network node can transmit a WUS to the UE during a first occasion. In some embodiments, the exemplary method can also include the operations of block 1010, where the network node can transmit, to a UE, a transmission configuration for periodic channel state information (CSI) reports during at least a first portion of the second occasions. The exemplary method can also include the operations of block 1030, where the network node can monitor for the periodic CSI reports during the second occasions, or during a first portion of the second occasions.

In some embodiments, the transmission configuration can identify a parameter to be excluded from a periodic CSI report that is not responsive to UE detection of a WUS. In such embodiments, the network node can determine whether the UE detected the WUS based on the inclusion of the parameter in a periodic CSI report, and respond accordingly (e.g., by transmitting a further WUS).

In some embodiments, the exemplary method can also include the operations of blocks 1040-1060. In block 1040, the network node can transmit, to the UE, a physical downlink control channel (PDCCH) message with scheduling information for a subsequent physical downlink shared channel (PDSCH) transmission by the network node. In block 1050, the network node can perform the PDSCH transmission according to the scheduling information. In block 1060, the network node can monitor for a response, by the UE, to the PDCCH message or the PDSCH transmission during a second portion of the second occasions. Furthermore, such embodiments can include a variant of block 1030, where the network node can monitor for the periodic CSI reports during a first portion of the second occasions (e.g., that are different than the second portion used for monitoring for the response in block 1060). The network node can respond accordingly based on the monitoring of the first and second portions. For example, if the network node detects periodic CSI feedback from the UE during an occasion of the first portion and detects no response by the UE during a corresponding occasion of the second portion, then the network node can transmit a further WUS to the UE.

Figure 11:
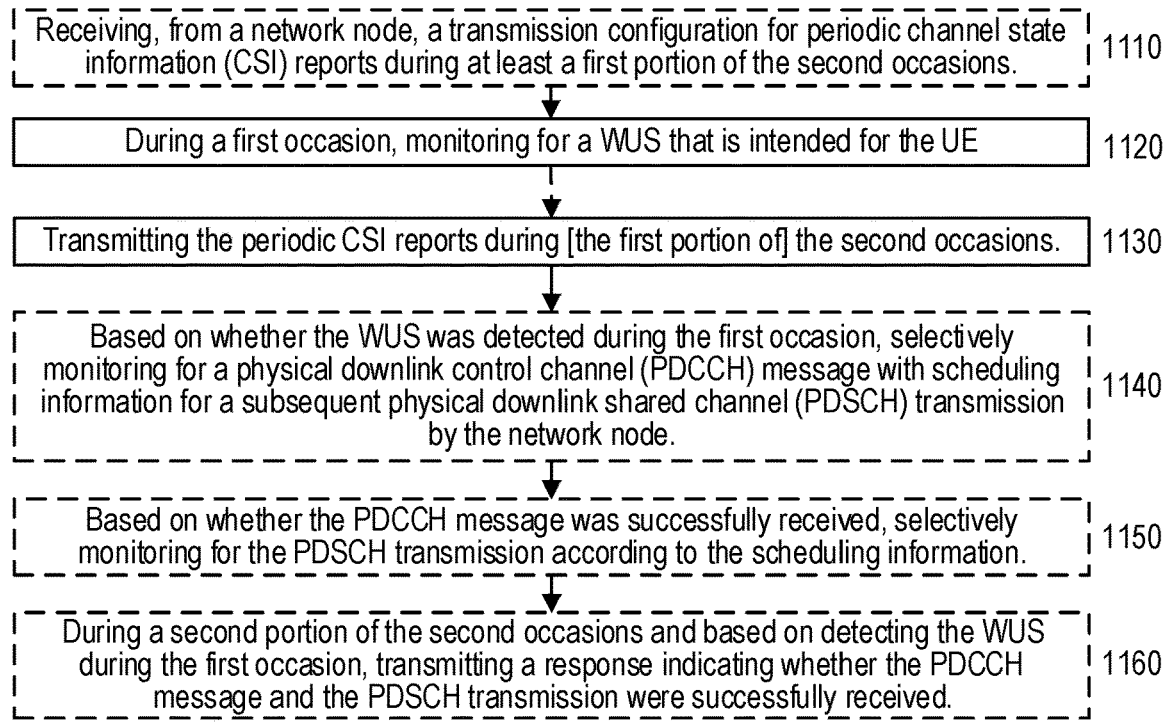
FIG. 11 shows a flow diagram of an exemplary method (e.g., procedure) performed by a user equipment (UE, e.g., wireless device, MTC device, NB-IoT device, modem, etc. or component thereof), according to various exemplary embodiments of the present disclosure.

In addition, FIG. 11 shows a flow diagram of an exemplary method (e.g., procedure) for receiving wake-up signals (WUS) transmitted by a network node in a radio access network (RAN), according to various exemplary embodiments of the present disclosure. The exemplary method can be performed by a user equipment (UE, e.g., wireless device, IoT device, modem, etc. or component thereof) in communication with the network node (e.g., base station, eNB, gNB, ng-eNB, CU/DU, etc., or component thereof) in the RAN (e.g., E-UTRAN, NG-RAN). Also, the exemplary method shown in FIG. 11 can be used cooperatively with other exemplary methods described herein (e.g., FIG. 10) to provide various exemplary benefits described herein. Although FIG. 11 shows specific blocks in a particular order, the operations of the exemplary method can be performed in a different order than shown and can be combined and/or divided into blocks having different functionality than shown. Optional blocks or operations are indicated by dashed lines.

The exemplary method shown in FIG. 11 can include the operations of block 1120, where the UE can, during a first occasion, monitor for a WUS that is intended for the UE. In some embodiments, the exemplary method can also include the operations of block 1110, where the UE can receive, from the network node, a transmission configuration for periodic channel state information (CSI) reports during at least a first portion of the second occasions. The exemplary method can also include the operations of block 1130, where the UE can transmit the periodic CSI reports during the second occasions, or during a first portion of the second occasions.

In some embodiments, the transmission configuration can identify a parameter to be excluded from a periodic CSI report that is not responsive to UE detection of a WUS. In such embodiments, the UE can indicate whether it detected the WUS (e.g., in block 1120) based on the inclusion of the parameter in a periodic CSI report.

In some embodiments, the exemplary method can also include the operations of blocks 1140-1160. In block 1040, the UE can, based on whether the WUS was detected during the first occasion, selectively monitor for a physical downlink control channel (PDCCH) message with scheduling information for a subsequent physical downlink shared channel (PDSCH) transmission by the network node. In block 1150, the UE can, based on whether the PDCCH message was successfully received, selectively monitor for the PDSCH transmission according to the scheduling information.

In block 1160, based on detecting the WUS during the first occasion, the UE can transmit, during a second portion of the second occasions, a response indicating whether the PDCCH message and the PDSCH transmission were successfully received. Furthermore, such embodiments can include a variant of block 1130, where the UE can transmit the periodic CSI reports during a first portion of the second occasions (e.g., that are different than the second portion used for transmitting the response in block 1160). The network node can respond accordingly based on the monitoring of the first and second portions. For example, if the network node detects periodic CSI feedback from the UE during an occasion of the first portion and detects no response by the UE during a corresponding occasion of the second portion, then the network node can transmit a further WUS to the UE.

The second group of embodiments, which facilitate network mitigation and/or recovery from UE missed WUS detection, will now be described in more detail.

In general, in the second group of embodiments, the network can override the conventional and/or default RLF mechanism, for a particular UE, if the UE is configured for WUS operation. In other words, instead of the default RLF mechanism, the network can apply a modified RLF mechanism for such UEs. As an exemplary default RLF mechanism, the network can declare a RLF for a UE if four (4) consecutive PDCCH+PDSCH transmissions to the UE do not result in ACK/NACK feedback from the UE. Various embodiments of a modified RLF mechanism are described below, based on this exemplary default RLF mechanism.

In some embodiments, instead of transmitting multiple PDCCH+PDSCH in one DRX On duration following a WUS, the network can retransmit the WUS in one of the UE's upcoming DRX On durations if the network detects a missed WUS detection by the UE based on the lack of ACK/NACK feedback. Alternately, or in addition, the network can retransmit the WUS prior to multiple upcoming DRX On durations for the UE, and declare a RLF if no ACK/NACK feedback is received in response to any of these transmissions. The number of WUS retransmissions (i.e., the number of missed WUS detections) before RLF declaration can be fixed, or the network can adapt it based on various factors such as network load, channel conditions for the UE, etc.

In some embodiments, the network can reset the count of missed WUS detections by the UE whenever the UE has received a WUS, acknowledged a DL data transmission, or initiated an UL transmission. Furthermore, the network can deactivate WUS operation by the UE if the UE has frequently missed the WUS. In such case, the UE would be configured to monitor PDCCH during every DRX On duration.

In other embodiments, upon a missed WUS detection by the UE, the network can retransmit the WUS using a more robust configuration that makes the WUS more easily detectable by the UE. For example, the network can select a higher AL than for the initial WUS, thereby facilitating increased redundancy of the detectable information in the subsequent WUS(s). As another example, the network can select a lower-payload DCI format for the same AL, thereby enabling a more-robust channel coding to be used. As another example, the network can increase the power level used to transmit the subsequent WUS, and/or reduce the power of other signals that could be interfering with the UE's WUS reception. As another example, the network can transmit the subsequent WUS using different time/frequency resources (e.g., RBs, symbols) than the initial WUS, which can mitigate the effects of frequency-selective fading on the WUS reception. Moreover, any of these exemplary techniques can be used in combination for subsequent WUS transmissions to the UE.

In other embodiments, the network can configure WUS only for some of the UE's DRX On durations, and leave other DRX On durations as unconditional, meaning the UE has to wake up for those durations independent of WUS. Moreover, in such unconditional DRX On durations, the UE can forego WUS monitoring and the network can forego WUS transmission to that particular UE. For a UE configured in this manner, if the UE has missed one or more WUS detections, the network can wait until an upcoming unconditional DRX On durations to contact the UE again.

In other embodiments, the network can configure a UE with additional WUS reception occasions within or outside of the UE's DRX On durations, e.g., as secondary reception occasions. If a UE configured in this manner has missed detection of a WUS in one or more primary reception occasions, then the network can retransmit the WUS in one or more of the secondary reception occasions. Once a UE has detected the WUS in a primary or a secondary occasion, it can ignore WUS transmitted in subsequent secondary occasions.

In the above-described embodiments, when a particular UE misses a WUS detection, the network can retransmit the WUS to the UE in the UE's next WUS reception occasion. However, if several UEs monitor the same WUS occasion(s) and/or are addressed by the same group identity within WUS-DCI, there will be unnecessary wakeup for group members other than the UE that missed the WUS detection. In some embodiments, to address this issue, the WUS can include a "repetition-indicator" by which the network can indicate that it is repeating the WUS for one or more particular members of the group. To group members that successfully received and/or decoded the previous WUS transmission, this indicator indicates the WUS repetition is not intended for them, and that they do not need to wake up in the associated DRX On duration.

In general, the network can increment the "repetition indicator" for each consecutive WUS repetition. In some embodiments, however, if the network wants to wake up all group members, the network can maintain the most recent value of the repetition indicator in subsequent WUS repetitions. Receiving consecutive WUS transmissions with the same repetition indicator value can indicate to group members that they should wake up for the subsequent DRX On duration.

The various embodiments described above can be further illustrated with reference to FIGS. 12-13, which show exemplary methods (e.g., procedures) performed by a network node and a UE, respectively. Put differently, various features of the operations described below correspond to various embodiments described above.

Figure 12:
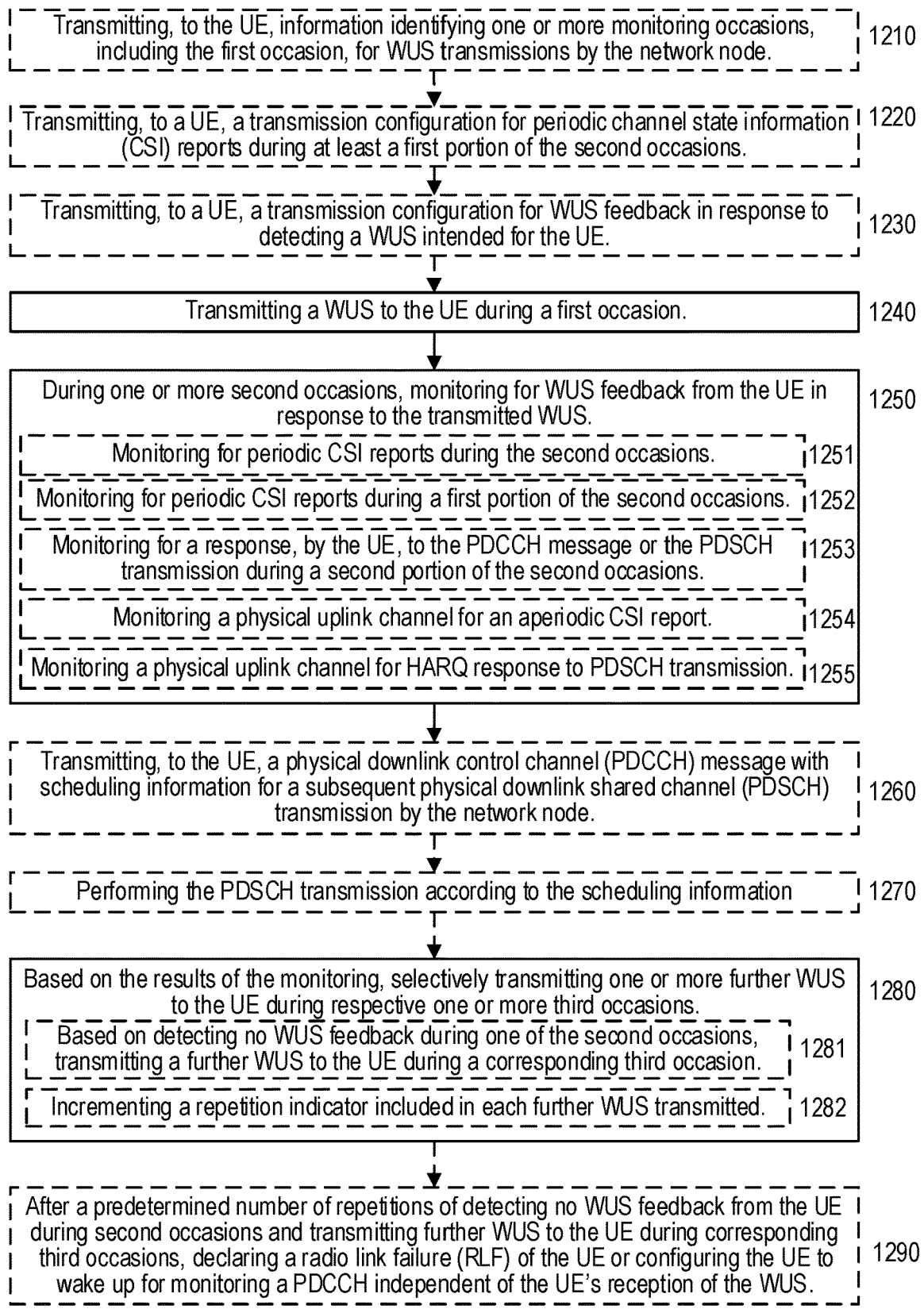
FIG. 12 shows a flow diagram of another exemplary method (e.g., procedure) performed by a network node, according to various exemplary embodiments of the present disclosure.

FIG. 12 shows a flow diagram of an exemplary method (e.g., procedure) for selective transmission of a wake-up signal (WUS) to one or more user equipment (UE), according to various exemplary embodiments of the present disclosure. The exemplary method can be performed by a network node (e.g., base station, eNB, gNB, ng-eNB, CU/DU, etc., or component thereof) of a radio access network (RAN, e.g., E-UTRAN, NG-RAN). Also, the exemplary method shown in FIG. 12 can be used cooperatively with other exemplary methods described herein (e.g., FIG. 11) to provide various exemplary benefits described herein. Although FIG. 12 shows specific blocks in a particular order, the operations of the exemplary method can be performed in a different order than shown and can be combined and/or divided into blocks having different functionality than shown. Optional blocks or operations are indicated by dashed lines.

The exemplary method can include operations of block 1240, where the network node can transmit a WUS to the UE during a first occasion. In some embodiments, the WUS can be transmitted as downlink control information (DCI) on a physical downlink control channel (PDCCH), and can indicate that the UE should monitor for a scheduling message on the PDCCH during a subsequent discontinuous reception (DRX) On duration for the UE.

The exemplary method can also include operations of block 1250, where the network node can, during one or more second occasions, monitor for WUS feedback from the UE in response to the transmitted WUS (e.g., in block 1240). The exemplary method can also include operations of block 1280, where the network node can, based on the results of the monitoring (e.g., in block 1250), selectively transmit one or more further WUS to the UE during respective one or more third occasions.

In some embodiments, the WUS transmitted to the UE also includes a bitfield of a plurality of bits, with each bit in the bitfield indicating whether the WUS is intended for a corresponding member of a group of UEs. In some embodiments, the WUS transmitted to the UE can also include a repetition indicator, e.g., having a value indicating a number of transmission repetitions of the WUS by the network node. In such embodiments, the operations of block 1280 can include the operations of sub-block 1282, where the network node can increment the repetition indicator included in each further WUS that is transmitted.

In some embodiments, the WUS can differ from the one or more further WUS in one or more of the following transmission characteristics: aggregation level, modulation and coding scheme, power level, interference from other signals transmitted concurrently, positions within respective timeslots, and frequency resources.

In some embodiments, the exemplary method can also include the operations of block 1210, where the network node can transmit, to the UE, information identifying one or more monitoring occasions, including the first occasion, for WUS transmissions by the network node. For example, at least a portion of the identified WUS monitoring occasions are not associated with subsequent physical downlink control channel (PDCCH) transmissions by the network node. Put a different way, some of the WUS monitoring or reception occasions can be independent of PDCCH reception occasions for the UE.

In some embodiments, the selective transmission operations of block 1280 can include the operations of sub-block 1281, where the network node can, based on detecting no WUS feedback from the UE during one of the second occasions, transmit a further WUS to the UE during a corresponding third occasion. In some embodiments, the exemplary method can also include the operations of block 1290, where the network node can, after a predetermined number of repetitions of detecting no WUS feedback from the UE during second occasions and transmitting further WUS to the UE during corresponding third occasions, perform one of the following operations: declaring a radio link failure (RLF) of the UE, or configuring the UE to wake up for monitoring a physical downlink control channel (PDCCH) independent of the UE's reception of the WUS.

In some embodiments, the exemplary method can also include the operations of block 1220, where the network node can transmit, to a UE, a transmission configuration for periodic channel state information (CSI) reports during at least a first portion of the second occasion. This operation can correspond to block 1010 of FIG. 10, discussed above. In such embodiments, the transmission configuration can identify a parameter to be excluded from a periodic CSI report that is not responsive to UE detection of a WUS, and the monitoring operations of block 1250 can include the operations of sub-block 1251, where the network node can monitor for the periodic CSI reports during the second occasions. This can correspond to the block 1030 of FIG. 10, discussed above. In addition, selectively transmitting the further WUS to the UE during each third occasion (e.g., in block 1280) can be based on whether a periodic CSI report received during a corresponding second occasion includes the parameter.

In some embodiments, the exemplary method can also include the operations of blocks 1260-1270. In block 1260, the network node can transmit, to the UE, a physical downlink control channel (PDCCH) message with scheduling information for a subsequent physical downlink shared channel (PDSCH) transmission by the network node. In block 1270, the network node can perform the PDSCH transmission according to the scheduling information. In such embodiments, the selective transmission operation in block 1280 can be based on detecting no WUS feedback during a second occasion in the same timeslot as the PDCCH message and during a second occasion after the PDSCH transmission.

Other embodiments can also include the operations of block 1220 (and block 1010 of FIG. 10), discussed above. In such embodiments, the monitoring operations in block 1250 can include the operations of sub-block 1252, where the network node can monitor for periodic CSI reports during a first portion of the second occasions, and sub-block 1253, where the network node ca monitor for a response, by the UE, to the PDCCH message (e.g., transmitted in block 1260) or the PDSCH transmission (e.g., in block 1270) during a second portion of the second occasions. In such embodiments, the selective transmission operation in block 1280 can be based on detecting periodic CSI feedback from the UE during a corresponding occasion of the first portion and detecting no response by the UE during a corresponding occasion of the second portion.

In some embodiments, the exemplary method can also include the operations of block 1220, where the network node can transmit, to a UE, a transmission configuration for WUS feedback in response to detecting a WUS intended for the UE. Different variants are described as follows.

In some of these embodiments, the transmission configuration for the WUS feedback comprises a request for an aperiodic channel state information (CSI) report from the UE. In such embodiments, the monitoring operations of block 1250 can include the operations of sub-block 1255, where the network node can monitor a physical uplink channel (e.g., PUCCH, PUSCH) for the aperiodic CSI report, e.g., which can be responsive to the UE detecting the WUS.

In other of these embodiments, the transmission configuration for the WUS feedback comprises scheduling information (e.g., DCI) for a subsequent physical downlink shared channel (PDSCH) transmission by the network node. In such embodiments, the exemplary method can also include the operations of block 1270 (discussed above), and the monitoring operations of block 1250 can include the operations of sub-block 1256, where the network node can monitor a physical uplink channel (e.g., PUCCH, PUSCH) for a hybrid ARQ response to the PDSCH transmission.

In other of these embodiments, the transmission configuration for the WUS feedback can include a configuration of resources for transmission of the WUS feedback, and a timing of the WUS feedback relative to the WUS transmission. In such embodiments, the configuration of resources and/or the relative timing can be included in the transmitted WUS (e.g., in block 1240).

Figure 13A:
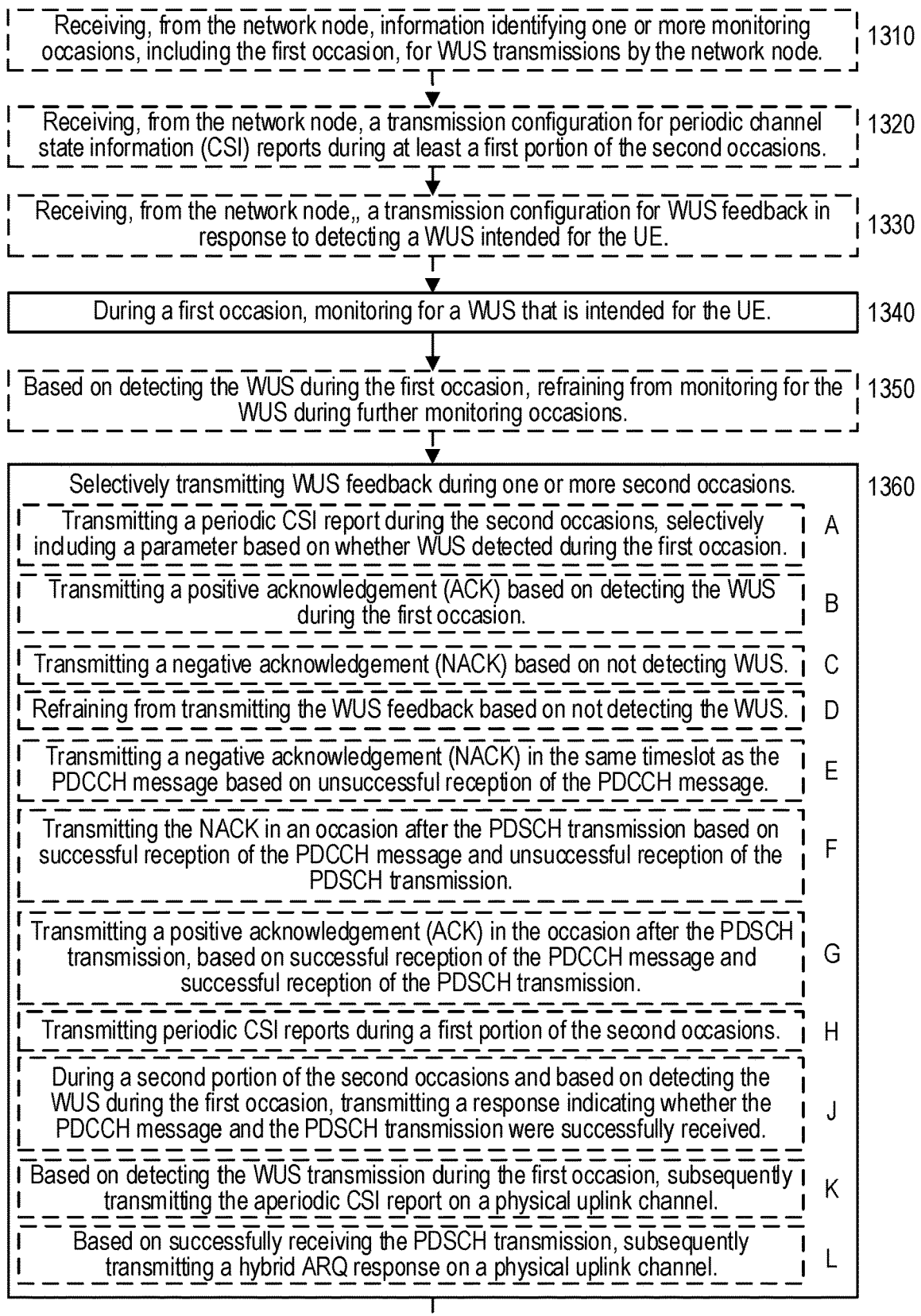
FIGS. 13A-B, shows a flow diagram of another exemplary method (e.g., procedure) performed by a UE, according to various exemplary embodiments of the present disclosure.
Figure 13B:
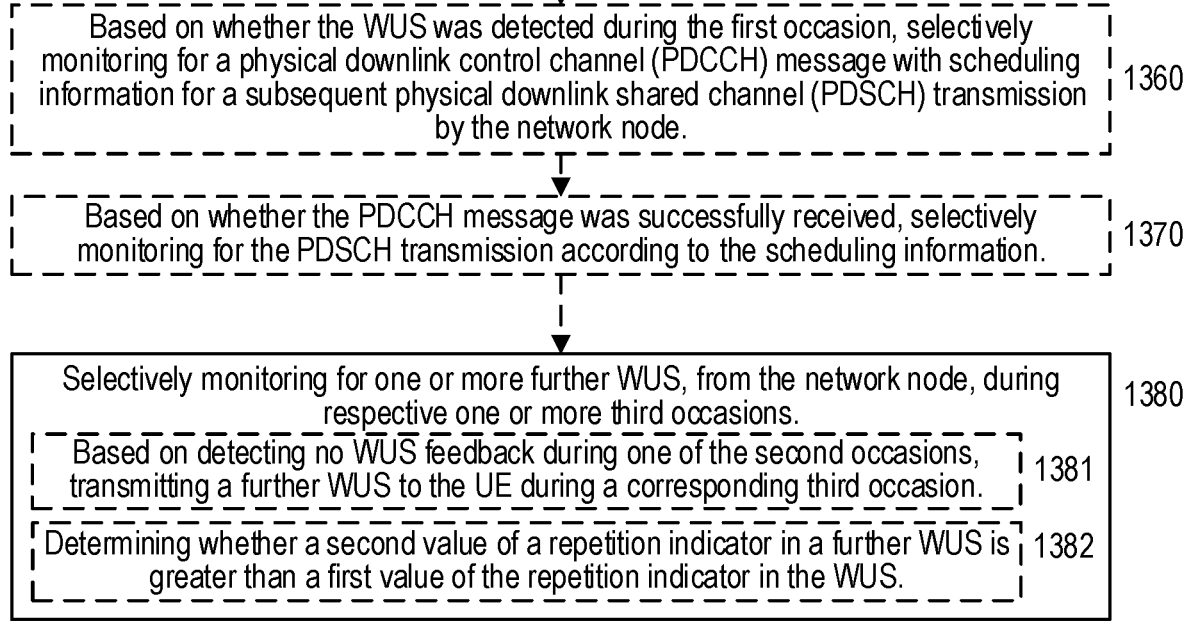

In addition, FIG. 13 (which includes FIGS. 13A-B) shows a flow diagram of an exemplary method (e.g., procedure) for receiving wake-up signals (WUS) transmitted by a network node in a radio access network (RAN), according to various exemplary embodiments of the present disclosure. The exemplary method can be performed by a user equipment (UE, e.g., wireless device, IoT device, modem, etc. or component thereof) in communication with the network node (e.g., base station, eNB, gNB, ng-eNB, CU/DU, etc., or component thereof) in the RAN (e.g., E-UTRAN, NG-RAN). Also, the exemplary method shown in FIG. 13 can be used cooperatively with other exemplary methods described herein (e.g., FIG. 12) to provide various exemplary benefits described herein. Although FIG. 13 shows specific blocks in a particular order, the operations of the exemplary method can be performed in a different order than shown and can be combined and/or divided into blocks having different functionality than shown. Optional blocks or operations are indicated by dashed lines.

The exemplary method can include operations of block 1340, where the UE can, during a first occasion, monitor for a WUS that is intended for the UE. In some embodiments, the WUS can be received as downlink control information (DCI) on a physical downlink control channel (PDCCH), and can indicate that the UE should monitor for a scheduling message on the PDCCH during a subsequent discontinuous reception (DRX) On duration for the UE.

The exemplary method can also include operations of block 1360, where the UE can, selectively transmit WUS feedback to the network node during one or more second occasions. The exemplary method can also include operations of block 1380, where the UE can selectively monitor for one or more further WUS, from the network node, during respective one or more third occasions. In some embodiments, the one or more second occasions correspond to the respective one or more third occasions.

In some embodiments, the WUS received by the UE also includes a bitfield of a plurality of bits, with each bit in the bitfield indicating whether the WUS is intended for a corresponding member of a group of UEs. In such embodiments, selectively transmitting the WUS feedback (e.g., in block 1380) can be based on a value of a particular one of the bits that is associated with the UE.

In some embodiments, the WUS received by the UE can also include a repetition indicator, e.g., having a value indicating a number of transmission repetitions of the WUS by the network node. In such embodiments, the selective monitoring operations of block 1380 can include the operations of sub-block 1382, where the UE can determine whether a second value of the repetition indicator in a further WUS is greater than a first value of the repetition indicator in the WUS.

In some embodiments, the WUS can differ from the one or more further WUS in one or more of the following transmission characteristics: aggregation level, modulation and coding scheme, power level, interference from other signals transmitted concurrently, positions within respective timeslots, and frequency resources.

In some embodiments, the exemplary method can also include the operations of block 1310, where the UE can receive, from the network node, information identifying one or more monitoring occasions, including the first occasion, for monitoring for WUS transmissions directed the UE by the network node. In some embodiments, at least a portion of the monitoring occasions can be independent of occasions where the UE is configured to wake up for monitoring a physical downlink control channel (PDCCH). In some embodiments, the monitoring occasions can also include one or more further monitoring occasions, and the exemplary method can also include the operations of block 1350, where the UE can refrain from monitoring for the WUS during the further monitoring occasions based on detecting the WUS during the first occasion.

In some embodiments, the exemplary method can also include the operations of block 1320, where the UE can receive, from the network node, a transmission configuration for periodic channel state information (CSI) reports during at least a first portion of the second occasions. In such embodiments, the transmission configuration can identify a parameter to be excluded from a periodic CSI report that is not responsive to UE detection of a WUS, and the selective transmission operations of block 1360 can include the operations of sub-block 1360A, where the UE can transmit the periodic CSI report during the second occasions, selectively including the parameter based on whether WUS was detected during the first occasion (e.g., in block 1340). This can correspond to the block 1130 of FIG. 11, discussed above.

In some embodiments, the exemplary method can also include the operations of blocks 1360-1370. In block 1360, the UE can, based on whether the WUS was detected during the first occasion, selectively monitor for a physical downlink control channel (PDCCH) message with scheduling information for a subsequent physical downlink shared channel (PDSCH) transmission by the network node. In block 1370, the UE can, based on whether the PDCCH message was successfully received, selectively monitor for the PDSCH transmission according to the scheduling information. perform the PDSCH transmission according to the scheduling information.

In these embodiments, the selective transmission operation in block 1360 can include the operations of sub-block 1360D and optionally also the operations of sub-blocks 1360E-G. In sub-block 1360D, the UE can refrain from transmitting the WUS feedback based on not detecting the WUS. In sub-block 1360E, the UE can transmit a negative acknowledgement (NACK) in the same timeslot as the PDCCH message based on unsuccessful reception of the PDCCH message. In sub-block 1360F, the UE can transmit the NACK in an occasion after the PDSCH transmission based on successful reception of the PDCCH message and unsuccessful reception of the PDSCH transmission. In sub-block 1360G, the UE can transmit a positive acknowledgement (ACK) in the occasion after the PDSCH transmission, based on successful reception of the PDCCH message and successful reception of the PDSCH transmission.

In some of these embodiments, the exemplary method can also include the operations of block 1330, discussed above. In these embodiments, the selective transmission operation in block 1360 can include the operations of sub-blocks 1360H-J. In sub-block 1360H, the UE can transmit the periodic CSI reports during the first portion of the second occasions. This can correspond to block 1130 of FIG. 11, discussed above. In sub-block 1360J, the UE can, during a second portion of the second occasions and based on detecting the WUS during the first occasion, transmit a response indicating whether the PDCCH message and the PDSCH transmission were successfully received. This can correspond to block 1160 of FIG. 11, discussed above. For example, the response can be any of those discussed above with respect to sub-blocks 1360E-G.

In some embodiments, the selective transmission operation in block 1360 can include the operations of sub-blocks 1360B, where the UE can transmit a positive acknowledgement (ACK) based on detecting the WUS during the first occasion. In addition, the selective transmission operation in block 1360 can include the operations of either sub-block 1360C (transmitting a negative acknowledgement) or 1360D (refraining from transmitting WUS feedback) based on the UE not detecting the WUS during the first occasion.

In some embodiments, the exemplary method can also include the operations of block 1330, where the UE can receive, from the network node, a transmission configuration for WUS feedback in response to detecting a WUS intended for the UE. Different variants are described as follows.

In some of these embodiments, the transmission configuration for the WUS feedback comprises a request for an aperiodic channel state information (CSI) report from the UE. In such embodiments, the selective transmission operation in block 1360 can include the operations of sub-blocks 1360K, where the UE can, based on detecting the WUS transmission during the first occasion, transmit the aperiodic CSI report on a physical uplink channel (e.g., PUCCH, PUSCH). For example, the aperiodic CSI report can act as WUS feedback.

In other of these embodiments, the transmission configuration for the WUS feedback comprises scheduling information (e.g., DCI) for a subsequent physical downlink shared channel (PDSCH) transmission by the network node. In such embodiments, the selective transmission operation in block 1360 can include the operations of sub-blocks 1360L, where the UE can, based on successfully receiving the PDSCH transmission, transmit a hybrid ARQ response on a physical uplink channel. For example, the HARQ response can act as WUS feedback.

In other of these embodiments, the transmission configuration for the WUS feedback can include a configuration of resources for transmission of the WUS feedback, and a timing of the WUS feedback relative to the WUS transmission. In such embodiments, the configuration of resources and/or the relative timing can be included in the transmitted WUS (e.g., received in block 1340).

Although various embodiments are described above in terms of methods, techniques, and/or procedures, the person of ordinary skill will readily comprehend that such methods, techniques, and/or procedures can be embodied by various combinations of hardware and software in various systems, communication devices, computing devices, control devices, apparatuses, non-transitory computer-readable media, computer program products, etc.

Figure 14:
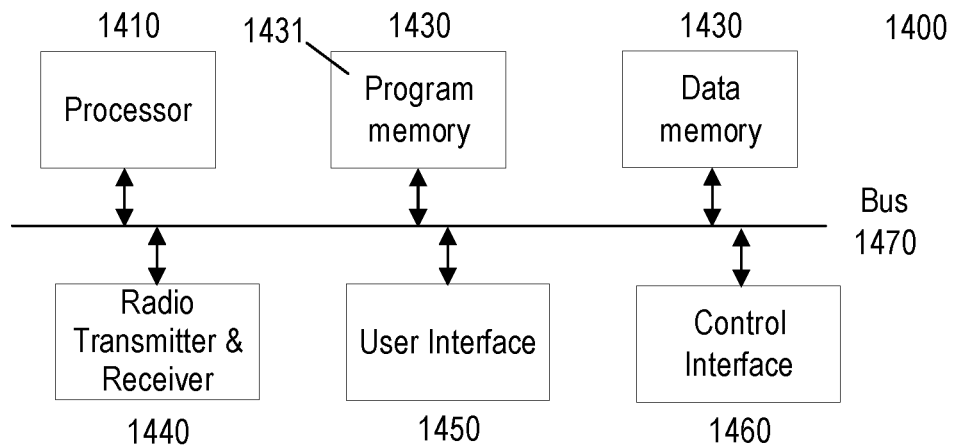
FIG. 14 is a block diagram of an exemplary wireless device or UE, according to various exemplary embodiments of the present disclosure.

FIG. 14 shows a block diagram of an exemplary wireless device or user equipment (UE) 1400 (hereinafter referred to as "UE 1400") according to various embodiments of the present disclosure, including those described above with reference to other figures. For example, UE 1400 can be configured by execution of instructions, stored on a computer-readable medium, to perform operations corresponding to one or more of the exemplary methods described herein.

UE 1400 can include a processor 1410 (also referred to as "processing circuitry") that can be operably connected to a program memory 1420 and/or a data memory 1430 via a bus 1470 that can comprise parallel address and data buses, serial ports, or other methods and/or structures known to those of ordinary skill in the art. Program memory 1420 can store software code, programs, and/or instructions (collectively shown as computer program product 1421 in FIG. 14) that, when executed by processor 1410, can configure and/or facilitate UE 1400 to perform various operations, including operations corresponding to various exemplary methods described herein. As part of or in addition to such operations, execution of such instructions can configure and/or facilitate UE 1400 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1xRTT, CDMA2000, 802.11 WiFi, HDMI, USB, Firewire, etc., or any other current or future protocols that can be utilized in conjunction with radio transceiver 1440, user interface 1450, and/or control interface 1460.

As another example, processor 1410 can execute program code stored in program memory 1420 that corresponds to MAC, RLC, PDCP, and RRC layer protocols standardized by 3GPP (e.g., for NR and/or LTE). As a further example, processor 1410 can execute program code stored in program memory 1420 that, together with radio transceiver 1440, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA). As another example, processor 1410 can execute program code stored in program memory 1420 that, together with radio transceiver 1440, implements device-to-device (D2D) communications with other compatible devices and/or UEs.

Program memory 1420 can also include software code executed by processor 1410 to control the functions of UE 1400, including configuring and controlling various components such as radio transceiver 1440, user interface 1450, and/or control interface 1460. Program memory 1420 can also comprise one or more application programs and/or modules comprising computer-executable instructions embodying any of the exemplary methods described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition, or as an alternative, program memory 1420 can comprise an external storage arrangement (not shown) remote from UE 1400, from which the instructions can be downloaded into program memory 1420 located within or removably coupled to UE 1400, so as to enable execution of such instructions.

Data memory 1430 can include memory area for processor 1410 to store variables used in protocols, configuration, control, and other functions of UE 1400, including operations corresponding to, or comprising, any of the exemplary methods described herein. Moreover, program memory 1420 and/or data memory 1430 can include non-volatile memory (e.g., flash memory), volatile memory (e.g., static or dynamic RAM), or a combination thereof. Furthermore, data memory 1430 can comprise a memory slot by which removable memory cards in one or more formats (e.g., SD Card, Memory Stick, Compact Flash, etc.) can be inserted and removed.

Persons of ordinary skill will recognize that processor 1410 can include multiple individual processors (including, e.g., multi-core processors), each of which implements a portion of the functionality described above. In such cases, multiple individual processors can be commonly connected to program memory 1420 and data memory 1430 or individually connected to multiple individual program memories and or data memories. More generally, persons of ordinary skill in the art will recognize that various protocols and other functions of UE 1400 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

Radio transceiver 1440 can include radio-frequency transmitter and/or receiver functionality that facilitates the UE 1400 to communicate with other equipment supporting like wireless communication standards and/or protocols. In some exemplary embodiments, the radio transceiver 1440 includes one or more transmitters and one or more receivers that enable UE 1400 to communicate according to various protocols and/or methods proposed for standardization by 3GPP and/or other standards bodies. For example, such functionality can operate cooperatively with processor 1410 to implement a PHY layer based on OFDM, OFDMA, and/or SC-FDMA technologies, such as described herein with respect to other figures.

In some exemplary embodiments, radio transceiver 1440 includes one or more transmitters and one or more receivers that can facilitate the UE 1400 to communicate with various LTE, LTE-Advanced (LTE-A), and/or NR networks according to standards promulgated by 3GPP. In some exemplary embodiments of the present disclosure, the radio transceiver 1440 includes circuitry, firmware, etc. necessary for the UE 1400 to communicate with various NR, NR-U, LTE, LTE-A, LTE-LAA, UMTS, and/or GSM/EDGE networks, also according to 3GPP standards. In some embodiments, radio transceiver 1440 can include circuitry supporting D2D communications between UE 1400 and other compatible devices.

In some embodiments, radio transceiver 1440 includes circuitry, firmware, etc. necessary for the UE 1400 to communicate with various CDMA2000 networks, according to 3GPP2 standards. In some embodiments, the radio transceiver 1440 can be capable of communicating using radio technologies that operate in unlicensed frequency bands, such as IEEE 802.11 WiFi that operates using frequencies in the regions of 2.4, 5.6, and/or 60 GHz. In some embodiments, radio transceiver 1440 can include a transceiver that is capable of wired communication, such as by using IEEE 802.3 Ethernet technology. The functionality particular to each of these embodiments can be coupled with and/or controlled by other circuitry in the UE 1400, such as the processor 1410 executing program code stored in program memory 1420 in conjunction with, and/or supported by, data memory 1430.

User interface 1450 can take various forms depending on the particular embodiment of UE 1400, or can be absent from UE 1400 entirely. In some embodiments, user interface 1450 can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 1400 can comprise a tablet computing device including a larger touchscreen display. In such embodiments, one or more of the mechanical features of the user interface 1450 can be replaced by comparable or functionally equivalent virtual user interface features (e.g., virtual keypad, virtual buttons, etc.) implemented using the touchscreen display, as familiar to persons of ordinary skill in the art. In other embodiments, the UE 1400 can be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many exemplary embodiments of the UE 1400 having a touch screen display are capable of receiving user inputs, such as inputs related to exemplary methods described herein or otherwise known to persons of ordinary skill.

In some embodiments, UE 1400 can include an orientation sensor, which can be used in various ways by features and functions of UE 1400. For example, the UE 1400 can use outputs of the orientation sensor to determine when a user has changed the physical orientation of the UE 1400's touch screen display. An indication signal from the orientation sensor can be available to any application program executing on the UE 1400, such that an application program can change the orientation of a screen display (e.g., from portrait to landscape) automatically when the indication signal indicates an approximate 90-degree change in physical orientation of the device. In this exemplary manner, the application program can maintain the screen display in a manner that is readable by the user, regardless of the physical orientation of the device. In addition, the output of the orientation sensor can be used in conjunction with various exemplary embodiments of the present disclosure.

A control interface 1460 of the UE 1400 can take various forms depending on the particular exemplary embodiment of UE 1400 and of the particular interface requirements of other devices that the UE 1400 is intended to communicate with and/or control. For example, the control interface 1460 can comprise an RS-232 interface, a USB interface, an HDMI interface, a Bluetooth interface, an IEEE ("Firewire") interface, an I$^2$C interface, a PCMCIA interface, or the like. In some exemplary embodiments of the present disclosure, control interface 1460 can comprise an IEEE 802.3 Ethernet interface such as described above. In some exemplary embodiments of the present disclosure, the control interface 1460 can comprise analog interface circuitry including, for example, one or more digital-to-analog converters (DACs) and/or analog-to-digital converters (ADCs).

Persons of ordinary skill in the art can recognize the above list of features, interfaces, and radio-frequency communication standards is merely exemplary, and not limiting to the scope of the present disclosure. In other words, the UE 1400 can comprise more functionality than is shown in FIG. 14 including, for example, a video and/or still-image camera, microphone, media player and/or recorder, etc. Moreover, radio transceiver 1440 can include circuitry necessary to communicate using additional radio-frequency communication standards including Bluetooth, GPS, and/or others. Moreover, the processor 1410 can execute software code stored in the program memory 1420 to control such additional functionality. For example, directional velocity and/or position estimates output from a GPS receiver can be available to any application program executing on the UE 1400, including any program code corresponding to and/or embodying any exemplary embodiments (e.g., of methods) described herein.

Figure 15:
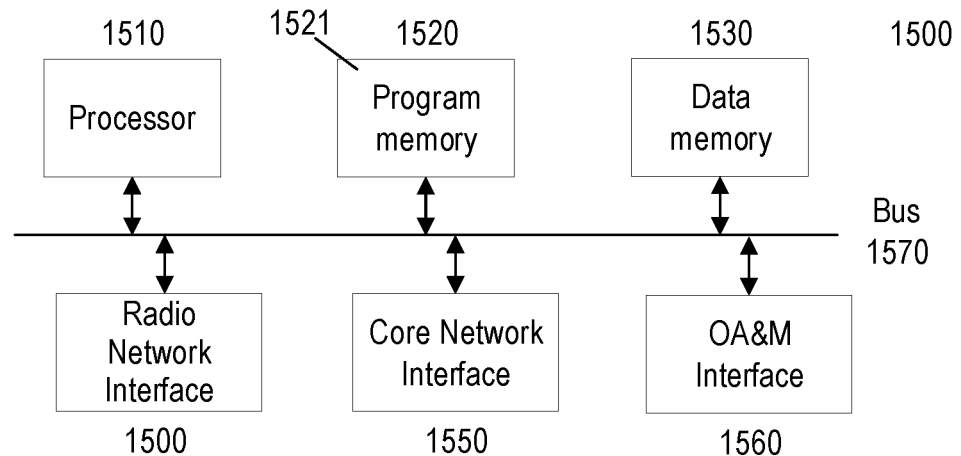
FIG. 15 is a block diagram of an exemplary network node, according to various exemplary embodiments of the present disclosure.

FIG. 15 shows a block diagram of an exemplary network node 1500 according to various embodiments of the present disclosure, including those described above with reference to other figures. For example, exemplary network node 1500 can be configured by execution of instructions, stored on a computer-readable medium, to perform operations corresponding to one or more of the exemplary methods described herein. In some exemplary embodiments, network node 1500 can comprise a base station, eNB, gNB, or one or more components thereof. For example, network node 1500 can be configured as a central unit (CU) and one or more distributed units (DUs) according to NR gNB architectures specified by 3GPP. More generally, the functionally of network node 1500 can be distributed across various physical devices and/or functional units, modules, etc.

Network node 1500 can include processor 1510 (also referred to as "processing circuitry") that is operably connected to program memory 1520 and data memory 1530 via bus 1570, which can include parallel address and data buses, serial ports, or other methods and/or structures known to those of ordinary skill in the art.

Program memory 1520 can store software code, programs, and/or instructions (collectively shown as computer program product 1521 in FIG. 15) that, when executed by processor 1510, can configure and/or facilitate network node 1500 to perform various operations, including operations corresponding to various exemplary methods described herein. As part of and/or in addition to such operations, program memory 1520 can also include software code executed by processor 1510 that can configure and/or facilitate network node 1500 to communicate with one or more other UEs or network nodes using other protocols or protocol layers, such as one or more of the PHY, MAC, RLC, PDCP, and RRC layer protocols standardized by 3GPP for LTE, LTE-A, and/or NR, or any other higher-layer (e.g., NAS) protocols utilized in conjunction with radio network interface 1540 and/or core network interface 1550. By way of example, core network interface 1550 can comprise the S1 or NG interface and radio network interface 1540 can comprise the Uu interface, as standardized by 3GPP. Program memory 1520 can also comprise software code executed by processor 1510 to control the functions of network node 1500, including configuring and controlling various components such as radio network interface 1540 and core network interface 1550.

Data memory 1530 can comprise memory area for processor 1510 to store variables used in protocols, configuration, control, and other functions of network node 1500. As such, program memory 1520 and data memory 1530 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1510 can include multiple individual processors (not shown), each of which implements a portion of the functionality described above. In such case, multiple individual processors may be commonly connected to program memory 1520 and data memory 1530 or individually connected to multiple individual program memories and/or data memories. More generally, persons of ordinary skill will recognize that various protocols and other functions of network node 1500 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1540 can comprise transmitters, receivers, signal processors, ASICs, antennas, beamforming units, and other circuitry that enables network node 1500 to communicate with other equipment such as, in some embodiments, a plurality of compatible user equipment (UE). In some embodiments, interface 1540 can also enable network node 1500 to communicate with compatible satellites of a satellite communication network. In some exemplary embodiments, radio network interface 1540 can comprise various protocols or protocol layers, such as the PHY, MAC, RLC, PDCP, and/or RRC layer protocols standardized by 3GPP for LTE, LTE-A, LTE-LAA, NR, NR-U, etc.; improvements thereto such as described herein above; or any other higher-layer protocols utilized in conjunction with radio network interface 1540. According to further exemplary embodiments of the present disclosure, the radio network interface 1540 can comprise a PHY layer based on OFDM, OFDMA, and/or SC-FDMA technologies. In some embodiments, the functionality of such a PHY layer can be provided cooperatively by radio network interface 1540 and processor 1510 (including program code in memory 1520).

Core network interface 1550 can comprise transmitters, receivers, and other circuitry that enables network node 1500 to communicate with other equipment in a core network such as, in some embodiments, circuit-switched (CS) and/or packet-switched Core (PS) networks. In some embodiments, core network interface 1550 can comprise the S1 interface standardized by 3GPP. In some embodiments, core network interface 1550 can comprise the NG interface standardized by 3GPP. In some exemplary embodiments, core network interface 1550 can comprise one or more interfaces to one or more AMFs, SMFs, SGWs, MMEs, SGSNs, GGSNs, and other physical devices that comprise functionality found in GERAN, UTRAN, EPC, 5GC, and CDMA2000 core networks that are known to persons of ordinary skill in the art. In some embodiments, these one or more interfaces may be multiplexed together on a single physical interface. In some embodiments, lower layers of core network interface 1550 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

In some embodiments, network node 1500 can include hardware and/or software that configures and/or facilitates network node 1500 to communicate with other network nodes in a RAN, such as with other eNBs, gNBs, ng-eNBs, en-gNBs, IAB nodes, etc. Such hardware and/or software can be part of radio network interface 1540 and/or core network interface 1550, or it can be a separate functional unit (not shown). For example, such hardware and/or software can configure and/or facilitate network node 1500 to communicate with other RAN nodes via the X2 or Xn interfaces, as standardized by 3GPP.

OA&M interface 1560 can comprise transmitters, receivers, and other circuitry that enables network node 1500 to communicate with external networks, computers, databases, and the like for purposes of operations, administration, and maintenance of network node 1500 or other network equipment operably connected thereto. Lower layers of OA&M interface 1560 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1540, core network interface 1550, and OA&M interface 1560 may be multiplexed together on a single physical interface, such as the examples listed above.

Figure 16:
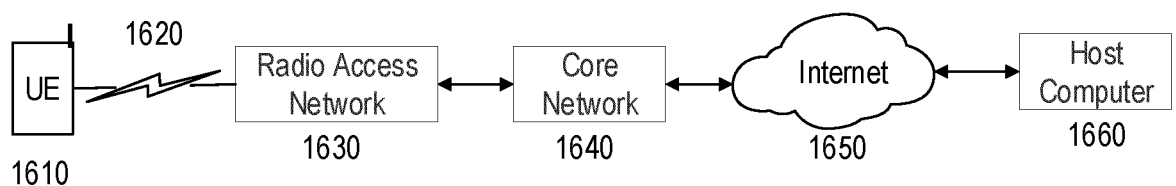
FIG. 16 is a block diagram of an exemplary network configured to provide over-the-top (OTT) data services between a host computer and a UE, according to various exemplary embodiments of the present disclosure.

FIG. 16 is a block diagram of an exemplary communication network configured to provide over-the-top (OTT) data services between a host computer and a user equipment (UE), according to one or more exemplary embodiments of the present disclosure. UE 1610 can communicate with radio access network (RAN) 1630 over radio interface 1620, which can be based on protocols described above including, e.g., LTE, LTE-A, and 5G/NR. For example, UE 1610 can be configured and/or arranged as shown in other figures discussed above.

RAN 1630 can include one or more terrestrial network nodes (e.g., base stations, eNBs, gNBs, controllers, etc.) operable in licensed spectrum bands, as well one or more network nodes operable in unlicensed spectrum (using, e.g., LAA or NR-U technology), such as a 2.4-GHz band and/or a 5-GHz band. In such cases, the network nodes comprising RAN 1630 can cooperatively operate using licensed and unlicensed spectrum. In some embodiments, RAN 1630 can include, or be capable of communication with, one or more satellites comprising a satellite access network.

RAN 1630 can further communicate with core network 1640 according to various protocols and interfaces described above. For example, one or more apparatus (e.g., base stations, eNBs, gNBs, etc.) comprising RAN 1630 can communicate to core network 1640 via core network interface 1650 described above. In some exemplary embodiments, RAN 1630 and core network 1640 can be configured and/or arranged as shown in other figures discussed above. For example, eNBs comprising an E-UTRAN 1630 can communicate with an EPC core network 1640 via an S1 interface. As another example, gNBs and ng-eNBs comprising an NG-RAN 1630 can communicate with a 5GC core network 1630 via an NG interface.

Core network 1640 can further communicate with an external packet data network, illustrated in FIG. 16 as Internet 1650, according to various protocols and interfaces known to persons of ordinary skill in the art. Many other devices and/or networks can also connect to and communicate via Internet 1650, such as exemplary host computer 1660. In some exemplary embodiments, host computer 1660 can communicate with UE 1610 using Internet 1650, core network 1640, and RAN 1630 as intermediaries. Host computer 1660 can be a server (e.g., an application server) under ownership and/or control of a service provider. Host computer 1660 can be operated by the OTT service provider or by another entity on the service provider's behalf.

For example, host computer 1660 can provide an over-the-top (OTT) packet data service to UE 1610 using facilities of core network 1640 and RAN 1630, which can be unaware of the routing of an outgoing/incoming communication to/from host computer 1660. Similarly, host computer 1660 can be unaware of routing of a transmission from the host computer to the UE, e.g., the routing of the transmission through RAN 1630. Various OTT services can be provided using the exemplary configuration shown in FIG. 16 including, e.g., streaming (unidirectional) audio and/or video from host computer to UE, interactive (bidirectional) audio and/or video between host computer and UE, interactive messaging or social communication, interactive virtual or augmented reality, etc.

The exemplary network shown in FIG. 16 can also include measurement procedures and/or sensors that monitor network performance metrics including data rate, latency and other factors that are improved by exemplary embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

The exemplary embodiments described herein provide efficient techniques for RAN 1630 to transmit wake-up signals to UEs—such as UE 1610—in a manner that reduces the UE power consumption for monitoring a PDCCH for further control messages. When used in NR and/or LTE UEs (e.g., UE 1610) and eNBs and/or gNBs (e.g., comprising RAN 1630), exemplary embodiments described herein can reduce UE power consumption for PDCCH monitoring, thereby facilitating such UEs to use their stored energy capacity (e.g., in a battery) for other operations, such as receiving and/or transmitting data via OTT services. Such improvements can result in increased use of such OTT services with less need to recharge UE batteries.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Embodiments of the techniques and apparatus described herein also include, but are not limited to, the following enumerated examples:

E1. A method for selective transmission of a wake-up signal (WUS) to one or more user equipment (UE) by a network node in a radio access network (RAN), the method comprising:
  transmitting, to a UE, a transmission configuration for WUS feedback in response to WUS transmissions by the network node, and
  transmitting a WUS to the UE during a first occasion;
  during one or more second occasions, monitoring for WUS feedback from the UE in response to the transmitted WUS; and
  based on the results of the monitoring, selectively transmitting one or more further WUS to the UE during respective one or more third occasions.

E2. The method of embodiment E1, wherein:
  the transmission configuration for the WUS feedback comprises a request for a channel state information (CSI) report from the UE; and
  monitoring for the WUS feedback during the second occasion comprises monitoring a physical uplink channel for the requested CSI report.

E3. The method of embodiment E1, wherein:
  the transmission configuration for the WUS feedback comprises scheduling information for a subsequent physical downlink shared channel (PDSCH) transmission by the network node;
  the method further comprises performing the PDSCH transmission according to the scheduling information; and
  monitoring for the WUS feedback during the second occasions comprises monitoring a physical uplink channel for a hybrid ARQ response to the PDSCH transmission.

E4. The method of embodiment E1, wherein the transmission configuration for the WUS feedback comprises:
  a configuration of resources for transmission of the WUS feedback; and
  a timing of the WUS feedback relative to the WUS transmission.

E5. The method of embodiment E4, wherein at least one of the configuration of resources and the relative timing is included in the WUS transmitted to the UE.

E6. The method of any of embodiments E1 or E4-E5, wherein:
  the WUS transmitted to the UE further includes a bitfield of a plurality of bits; and
  each bit in the bitfield indicates whether the WUS is intended for a corresponding member of a group of UEs.

E7. The method of any of embodiments E1-E6, wherein:
  the WUS transmitted to the UE further includes a repetition indicator; and
  selectively transmitting the one or more further WUS comprises incrementing the repetition indicator included in each further WUS that is transmitted.

E8. The method of any of embodiments E1-E11, wherein:
  the method further comprises transmitting, to the UE, a physical downlink control channel (PDCCH) message with scheduling information for a subsequent physical downlink shared channel (PDSCH) transmission by the network node; and
  the one or more second occasions comprise:
    a duration following the WUS transmission, and
    a duration following the PDCCH transmission.

E9. The method of embodiment E8, wherein:
  the method further comprises performing the PDSCH transmission according to the scheduling information; and
  the one or more second occasions further comprise a duration following the PDSCH transmission.

E10. The method of any of embodiments E8-E9, wherein monitoring for the WUS feedback during the second occasions comprises monitoring for a positive WUS acknowledgement (WUS-ACK) and one of the following: a negative WUS acknowledgement (WUS-NACK), or no WUS feedback.

E11. The method of any of embodiments E1-E10, wherein selectively transmitting the one or more further WUS comprises, based on detecting no WUS feedback from the UE during one of the second occasions, transmitting a further WUS to the UE during a corresponding third occasion.

E12. The method of embodiment E11, further comprising, after a predetermined number of repetitions of detecting no WUS feedback from the UE and transmitting a further WUS to the UE, performing one of the following operations:
  declaring a radio link failure (RLF) of the UE, or
  configuring the UE to wake up for monitoring a physical downlink control channel (PDCCH) independent of the UE's reception of the WUS.

E13. The method of any of embodiments E1-E12, wherein transmissions of the one or more further WUS differ from the transmission of the WUS in one or more of the following transmission characteristics: aggregation level, modulation and coding scheme, power level, interference level, and frequency resources.

E14. The method of any of embodiments E1-E13, further comprising transmitting, to the UE, information identifying one or more monitoring occasions for WUS transmissions by the network node, wherein at least a portion of the identified WUS monitoring occasions are not associated with subsequent physical downlink control channel (PDCCH) transmissions by the network node.

E15. A method for receiving wake-up signals (WUS) transmitted by a network node in a radio access network (RAN), the method comprising:
  receiving, from the network node, information identifying one or more monitoring occasions for monitoring for WUS transmissions directed the UE by the network node;
  receiving, from the network node, a transmission configuration for WUS feedback in response to detecting a WUS transmission during a monitoring occasion;
  during the identified monitoring occasions, monitoring for WUS transmissions directed to the UE; and
  selectively transmitting the WUS feedback based on the results of the monitoring.

E16. The method of embodiment E15, wherein:
  the transmission configuration for the WUS feedback comprises a request for a channel state information (CSI) report from the UE; and
  selectively transmitting the WUS feedback comprises, based on detecting the WUS transmission during one of the monitoring occasions, subsequently transmitting the CSI report on a physical uplink channel.

E17. The method of embodiment E15, wherein:
  the transmission configuration for the WUS feedback comprises scheduling information for a subsequent physical downlink shared channel (PDSCH) transmission by the network node;
  selectively transmitting the WUS feedback comprises, based on successfully receiving the PDSCH transmission, subsequently transmitting the hybrid ARQ response on a physical uplink channel.

E18. The method of embodiment E15, wherein the transmission configuration for the WUS feedback comprises:
  a configuration of resources for transmission of the WUS feedback; and
  a timing of the WUS feedback relative to the WUS transmission.

E19. The method of embodiment E18, wherein at least one of the configuration of resources and the relative timing is included in the WUS transmitted to the UE.

E20. The method of any of embodiments E15 or E18-E19, wherein:
  the WUS further includes a bitfield of a plurality of bits, each bit indicating whether the WUS is intended for a corresponding member of a group of UEs; and
  monitoring for WUS transmissions directed to the UE comprises detecting the value of a particular one of the bits that is associated with the UE.

E21. The method of any of embodiments E15-E20, wherein:
  the WUS further includes a repetition indicator; and
  monitoring for WUS transmissions directed to the UE comprises determining whether a current value of the repetition indicator is greater than a previous value of the repetition indicator.

E22. The method of any of embodiments E15-E21, wherein selectively transmitting the WUS feedback comprises:
  in response to successful reception of the WUS during a monitoring occasion, monitoring for a physical downlink control channel (PDCCH) message with scheduling information for a subsequent physical downlink shared channel (PDSCH) transmission by the network node; and
  selectively transmitting the WUS feedback based on the results of monitoring for the PDCCH.

E23. The method of embodiment E22, wherein selectively transmitting the WUS feedback comprises:
  in response to successful reception of the PDCCH, monitoring for the PDSCH transmission according to the scheduling information; and
  selectively transmitting the WUS feedback based on the results of monitoring for the PDSCH.

E24. The method of any of embodiments E15-E21, wherein selectively transmitting the WUS feedback based on the results of the monitoring comprises transmitting a positive WUS acknowledgement (WUS-ACK) if a WUS is detected E25. The method of embodiment E24, wherein selectively transmitting the WUS feedback based on the results of the monitoring further comprises one of the following:
  transmitting a negative WUS acknowledgement (WUS-NACK) if a WUS is not detected, or
  refraining from transmitting WUS feedback if a WUS is not detected.

E26. The method of any of embodiments E15-E25, wherein at least a portion of the monitoring occasions are independent of occasions where the UE is configured to wake up for monitoring a physical downlink control channel (PDCCH).

E27. A network node, in a radio access network (RAN), configured for selective transmission of a wake-up signal (WUS) to one or more user equipment (UE), the network node comprising:
  communication circuitry configured to communicate with the one or more UEs; and
  processing circuitry operatively associated with the communication circuitry and configured to perform operations corresponding to the methods of any of exemplary embodiments E1-E14.

E28. A non-transitory, computer-readable medium storing computer-executable instructions that, when executed by at least one processor of a network node, configure the network node to perform operations corresponding to the methods of any of exemplary embodiments E1-E14.

E29. A user equipment (UE) configured to receive wake-up signals (WUS) transmitted by a network node in a radio access network (RAN), the UE comprising:
  communication circuitry configured to communicate with the network node; and
  processing circuitry operatively associated with the communication circuitry and configured to perform operations corresponding to the methods of any of embodiments E15-E26.

E30. A non-transitory, computer-readable medium storing computer-executable instructions that, when executed by at least one processor of a user equipment (UE), configure the UE to perform operations corresponding to the methods of any of embodiments E15-E26.

Notably, modifications and other embodiments of the disclosed embodiments will come to mind to one skilled in the art having the benefit of the teachings presented in the foregoing descriptions and the associated drawings. Therefore, it is to be understood that the scope of the disclosure is not to be limited to the specific embodiments disclosed and that modifications and other variants are intended to be included within the scope. Although specific terms can be employed herein, they are used in a generic and descriptive sense only and not for purposes of limitation.

The invention claimed is:

1. A method for selective transmission of wake-up signals (WUS) to a user equipment (UE) by a network node in a radio access network (RAN), the method comprising:
- transmitting, to the UE, a transmission configuration for WUS feedback in response to UE detection a WUS intended for the UE, wherein the transmission configuration identifies a parameter to be excluded from a periodic channel state information (CSI) report that is not responsive to UE detection of a WUS intended for the UE;
- transmitting a WUS to the UE during a first occasion;
- during one or more second occasions, monitoring for WUS feedback from the UE in response to the transmitted WUS, wherein the WUS feedback being monitored for includes the periodic CSI reports; and
- based on whether a periodic CSI report received during a second occasion includes the parameter, selectively transmitting one or more further WUS to the UE during respective one or more third occasions,
- wherein the WUS differs from the one or more further WUS in one or more of the following transmission characteristics: aggregation level, modulation and coding scheme, absolute power level, power level relative to power levels of other signals that could interfere, positions within respective timeslots, and frequency resources.

2. The method of claim 1, wherein:
- the WUS transmitted during the first occasion includes a bitfield of a plurality of bits; and
- each bit in the bitfield indicates whether the WUS is intended for a corresponding member of a group of UEs.

3. The method of claim 1, wherein:
- the method further comprises transmitting, to the UE, information identifying one or more WUS monitoring occasions, including the first occasion, for WUS transmissions by the network node; and
- one or more of the identified WUS monitoring occasions are independent of occasions in which the UE is configured to monitor for physical downlink control channel (PDCCH) transmissions by the network node.

4. The method of claim 1, wherein:
- selectively transmitting the further WUS comprises, based on detecting no WUS feedback from the UE during one of the second occasions, transmitting a further WUS to the UE during a corresponding third occasion; and
- the method further comprises, after a predetermined number of repetitions of detecting no WUS feedback from the UE during second occasions and transmitting further WUS to the UE during corresponding third occasions, performing one of the following operations: declaring a radio link failure (RLF) of the UE; or configuring the UE to wake up for monitoring a physical downlink control channel (PDCCH) independent of the UE's reception of the WUS.

5. The method of claim 1, further comprising:
- transmitting, to the UE, a physical downlink control channel (PDCCH) message with scheduling information for a subsequent physical downlink shared channel (PDSCH) transmission by the network node; and
- performing the PDSCH transmission according to the scheduling information.

6. The method of claim 5, wherein selectively transmitting the one or more further WUS during each third occasion is further based on one of the following:
- detecting no WUS feedback from the UE during the following: a second occasion in the same timeslot as the PDCCH message, and a second occasion after the PDSCH transmission; or
- detecting a periodic CSI report from the UE during one of the second occasions, and detecting no response by the UE to the PDCCH message or the PDSCH transmission during another of the second occasions.

7. The method of claim 1, wherein the transmission configuration for WUS feedback includes one of the following:
- a request for an aperiodic CSI report from the UE;
- scheduling information for a subsequent physical downlink shared channel (PDSCH) transmission by the network node; or
- a configuration of resources for transmission of the WUS feedback and an indication of timing of the WUS feedback relative to the WUS transmission.

8. The method of claim 7, wherein monitoring for the WUS feedback during the second occasions comprises monitoring a physical uplink channel for one of the following: the aperiodic CSI report, or a hybrid ARQ response to the PDSCH transmission.

9. The method of claim 1, wherein:
- the WUS is transmitted as downlink control information (DCI) on a physical downlink control channel (PDCCH); and
- the WUS indicates that the UE should monitor for a scheduling message on the PDCCH during a subsequent discontinuous reception (DRX) On duration for the UE.

10. A network node configured for selective transmission of wake-up signals (WUS) to a user equipment (UE) in a radio access network (RAN), wherein the network node comprises:
- radio network interface circuitry configured to communicate with the UE; and
- processing circuitry operatively associated with the radio network interface circuitry, whereby the processing circuitry and the radio network interface circuitry are configured to:
  - transmit, to the UE, a transmission configuration for WUS feedback in response to UE detection a WUS intended for the UE, wherein the transmission configuration identifies a parameter to be excluded from a periodic channel state information (CSI) report that is not responsive to UE detection of a WUS intended for the UE;
  - transmit a WUS to the UE during a first occasion;
  - during one or more second occasions, monitor for WUS feedback from the UE in response to the transmitted WUS, wherein the WUS feedback being monitored for includes the periodic CSI reports; and
  - based on whether a periodic CSI report received during a second occasion includes the parameter, selectively transmit one or more further WUS to the UE during respective one or more third occasions,
  - wherein the WUS differs from the one or more further WUS in one or more of the following transmission characteristics: aggregation level, modulation and coding scheme, absolute power level, power level relative to power levels of other signals that could interfere, positions within respective timeslots, and frequency resources.

* * * * *